US 8,428,187 B2

(12) United States Patent
Yoshimoto et al.

(10) Patent No.: US 8,428,187 B2
(45) Date of Patent: Apr. 23, 2013

(54) RECEPTION DEVICE AND RECEPTION METHOD

(75) Inventors: Takashi Yoshimoto, Osaka (JP); Ryota Yamada, Osaka (JP); Kazuyuki Shimezawa, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 658 days.

(21) Appl. No.: 12/665,645

(22) PCT Filed: Apr. 25, 2008

(86) PCT No.: PCT/JP2008/058087
§ 371 (c)(1),
(2), (4) Date: Dec. 18, 2009

(87) PCT Pub. No.: WO2008/155947
PCT Pub. Date: Dec. 24, 2008

(65) Prior Publication Data
US 2010/0290564 A1    Nov. 18, 2010

(30) Foreign Application Priority Data

Jun. 19, 2007  (JP) ................. P2007-161269

(51) Int. Cl.
*H04L 27/00*    (2006.01)
(52) U.S. Cl.
USPC ........................................... 375/316
(58) Field of Classification Search ............. 375/260, 375/316, 340, 346; 455/132, 137
See application file for complete search history.

(56) References Cited

U.S. PATENT DOCUMENTS

| | | | |
|---|---|---|---|
| 7,010,070 B2 | 3/2006 | Li et al. | |
| 7,127,014 B2 | 10/2006 | Li et al. | |
| 7,127,024 B2 | 10/2006 | Garzarolli et al. | |
| 2004/0184550 A1* | 9/2004 | Yoshida et al. | 375/260 |
| 2004/0235421 A1* | 11/2004 | Matsuoka et al. | 455/63.4 |
| 2005/0100109 A1* | 5/2005 | Nagata et al. | 375/260 |
| 2005/0129136 A1 | 6/2005 | Fujii et al. | |
| 2006/0262869 A1* | 11/2006 | Yoshida | 375/260 |
| 2006/0291375 A1 | 12/2006 | Nishikawa | |
| 2007/0002985 A1 | 1/2007 | Kimata et al. | |

FOREIGN PATENT DOCUMENTS

| | | |
|---|---|---|
| JP | 2004-221702 A | 8/2004 |
| JP | 2005-79911 A | 3/2005 |

(Continued)

OTHER PUBLICATIONS

Zhou, et al., "Downlink Transmission of Broadband OFCDM Systems—Part I: Hybrid Detection", IEEE Transactions on Communications, vol. 53, No. 4, Apr. 2005, pp. 718-729.

*Primary Examiner* — Khanh C Tran
(74) *Attorney, Agent, or Firm* — Birch, Stewart, Kolasch & Birch, LLP

(57) ABSTRACT

A reception device includes a replica signal generating unit which generates a replica signal which is a replica of a transmitted signal based on a received signal, a time period setting unit which sets a plurality of time periods which time period of the received signal is divided into based on a received power of the received signal, an arrival wave removing unit which removes an arrival waves from the received signal for each time period set by the time period setting unit using the replica signal generated by the replica signal generating unit, a combining unit which combines the signals that the arrival waves are removed by the arrival wave removing unit from the received signal for each time periods set by the time period setting unit; and a demodulation processing unit which performs a demodulation process for the signal combined by the combining unit.

14 Claims, 24 Drawing Sheets

FOREIGN PATENT DOCUMENTS

| | | |
|---|---|---|
| JP | 2005-150839 A | 6/2005 |
| JP | 2005-198223 A | 7/2005 |
| JP | 2005-328391 A | 11/2005 |
| JP | 2006-325063 A | 11/2006 |
| JP | 2007-6067 A | 1/2007 |
| JP | 2007-13584 A | 1/2007 |

* cited by examiner

RECEPTION DEVICE AND RECEPTION METHOD

TECHNICAL FIELD

The present invention relates to a reception device and a reception method, especially a reception device and a reception method of transmitting and receiving signals using a multi-carrier system.

Priority is claimed on Japanese Patent Application No. 2007-161269, filed Jun. 19, 2007, the contents of which are incorporated herein by reference.

BACKGROUND ART

In a multi-carrier transmission, if there is a delay wave which is over a guard interval (GI), an inter symbol interference (ISI) or an inter carrier interference (ICI) occurs. If a previous symbol enters an FFT (Fast Fourier Transform) interval, the inter symbol interference occurs. If breaks (in other words, a discontinuous interval) of the symbol enter the FFT interval, the inter carrier interference occurs.

FIG. 28 is a diagram showing signals which are transmitted from a wireless transmission device to a wireless reception device via a multi-pass environment. Here, the horizontal axis is time. Symbols s1 to s4 indicate signals which are transmitted from the wireless transmission device to the wireless reception device via a multi-pass environment, and are transmitted via four multi-pass. In previous symbols, guard intervals (GI) which are copied latter of the symbols are added A first signal s1 from the above indicates a direct wave, and a second signal s2 indicates a delay wave which occurs a delay t1 which is shorter than the guard interval (GI). The direct wave and the delay wave are also called arrival waves.

A third signal s3 and a fourth signal s4 are delay signals which occur delays t2 and t3 which are over guard intervals (GI).

The diagonal line portion of previous third and fourth delay waves s3 and s4 indicate portions where the previous symbol of predetermined symbol enters the FFT interval of the predetermined symbol. The interval t4 indicates the FFT interval of the predetermined symbol. The diagonal line portions become the ISI elements. The ISI element occurs a characteristics depletion of demodulation, because the ISI element is an interference element. In a third delay wave of signal s3 and a fourth delay wave of signal s4, symbol's breaks enter the interval t4, and this occurs the ICI.

FIG. 29(a) and FIG. 29(b) are diagrams showing a state that sub-carriers are orthogonal, and interference occurs between sub-carriers by the ICI, in transmission and received signals of multi-carrier system. FIG. 29(a) shows a state that the ICI does not occur and interference does not occur between sub-carriers. FIG. 29(b) shows a state that the interference occurs between sub-carriers by the ICI.

When the delay wave which is over the guard interval (GI), as shown in FIG. 29(a), if the dot line portion is looked at, a certain one sub-carrier element is included, and another sub-carrier element is not included. This state is that the orthogonality is maintained. In normal multi-carrier communication, the demodulation is performed in this state.

In contrast to this, if the delay wave which is over the guard interval (GI) exists, as shown in FIG. 29(b), when the frequency shown dot line portion is looked at, a contiguous sub-carrier element and not a predetermined sub-carrier element is included, and interference occurs. This state is that orthogonality is not maintained between sub-carriers. ICI becomes a reason of characteristics depletion.

Patent Document 1 discloses one method to improve the characteristics depletion by ISI and ICI, when delay waves are over the guard interval (GI). In this prior art, after performing a demodulation operation once, using an error correction result (output of a MAP decoder), after generating copy signal (replica signal) except predetermined sub-carriers which include the ISI element and ICI element, then, for the copy signal which is removed from the received signal, the demodulation operation is performed again, and the characteristics of the ISI and the ICI are improved.

On the other hand, as the system which combines the multi-carrier transmission system and the CDM (Code Division Multiplexing) system, the MC-CDM (Multi Carrier Code Division Multiplexing) system has been suggested.

FIG. 30(a) and FIG. 30(b) are diagrams showing a relationship between orthogonal codes corresponding to the sub-carrier of the MC-CDMA system, and each sub-carrier. In these figures, the horizontal axis indicates frequency. In FIG. 30(a), for example, eight sub-carriers of the MC-CDM system are indicated. In FIG. 30(b), as orthogonal codes which corresponding to each sub-carrier, three types ($C_{8,1}$, $C_{8,2}$ and $C_{8,7}$) are shown. Here, $C_{8,1}$=(1, 1, 1, 1, 1, 1, 1, 1), $C_{8,2}$=(1, 1, 1, 1, -1, -1, -1, -1) and $C_{8,7}$=(1, -1, -1, 1, 1, -1, -1, 1). By multiplexing the three types of orthogonal codes to the data, it is possible to communicate with multiplexing three data sequences at same time and using the same frequency. This is one feature of the MC-CDM system.

Three types of orthogonal codes C8,1, C8,2, and C8,7 are orthogonal codes which have a cycle of eight entirely. By multiplexing between one cycles, in the orthogonal codes, it is possible to separate the data.

FIG. 31(a) and FIG. 31(b) are diagrams showing $C'_{8,1}$, $C'_{8,2}$, $C'_{8,7}$, $C''_{8,1}$, $C''_{8,2}$ and $C''_{8,7}$ when the signals of the MC-CDMA system are transmitted, and then received by the wireless reception device. FIG. 31(a) shows a state when the frequency change is not occurred in the cycle of the orthogonal codes. In this case, the de-spreading is performed with $C_{8,1}$. In other words, an inner product with $C_{8,1}$ is calculated. If all values in the SFfreq are added, $C'_{8,1}$ is 4, $C'_{8,2}$ and $C'_{8,7}$ are zero. A state like this is called the orthogonality between codes is maintained.

In contrast this, in FIG. 31(b), when a frequency change exists in the cycle of the orthogonal codes, if inverse diffusion is performed with $C_{8,1}$, $C''_{8,1}$ is 5, $C''_{8,2}$ is 3, and $C''_{8,7}$ is zero. In other words, the interference element exists between $C''_{8,1}$ and $C''_{8,2}$, and the orthogonality between codes is not maintained. Like this, if the frequency change of channels is rapid (changes early along in the frequency direction), in the MC-CDMA system, the multi code interference becomes a reason of characteristics depletion.

Patent Document 2 and Non-Patent Document 1 disclose one method of improving characteristics depletion by breaking of the orthogonality between the codes. In this prior arts, the difference between the downlink and uplink exists. However, both of them use the data after the error correction or the inverse diffusion is performed, and the characteristics is improved by removing other than the predetermined signal, to remove multi code interference by code multiplexing during MC-CDMA communication.

Patent Document 1: Japanese Unexamined Patent Publication, First Publication No. 2004-221702
Patent Document 2: Japanese Unexamined Patent Publication, First Publication No. 2005-198223
Non-Patent Document 1: "Downlink Transmission of Broadband OFCDM Systems-Part I: Hybrid Detection", Zhou, Y.; Wang, J.; Sawahashi, M. Page(s): 718-729, IEEE Transactions on Communication (Vol. 53, Issue 4)

DISCLOSURE OF INVENTION

Problem to be Solved by the Invention

However, in the aforementioned art, when the multi carrier signals and the MC-CDM signal which include a lot of subcarriers are demodulated, the calculation number is increased. In addition, when the multi code interference of the MC-CDM is removed, the calculation for the code multiplexing number is increased.

The present invention is created in light of the aforementioned circumstances, and an object thereof is to provide a reception device and a reception method capable of decreasing the calculation of demodulating the signal by the reception device from the transmission device.

Means for Solving the Problem (1) The present invention is created in light of the aforementioned circumstances, and an object thereof is to provide a reception device comprising: a replica signal generating unit which generates a replica signal which is a replica of a transmitted signal based on a received signal; a time period setting unit which sets a plurality of time periods which time period of the received signal is divided into based on a received power of the received signal; a arrival wave removing unit which removes an arrival waves from the received signal for each time period set by the time period setting unit using the replica signal generated by the replica signal generating unit; a combining unit which combines the signals that the arrival waves are removed by the arrival wave removing unit from the received signal for each time periods set by the time period setting unit; and a demodulation processing unit which performs a demodulation process for the signal combined by the combining unit.

(2) Moreover, in the above described reception device, the arrival wave removing unit comprising: an arrival wave replica generating unit which generates a replica of the arrival wave of each time period based on a channel impulse response estimation value of the received signal, the replica signal generated by the replica signal generating unit and the time periods set by the time period setting unit; and a subtracting unit which abstracts the received signal of each time periods set by the time period setting unit by subtracting the replica of the arrival wave of each time period generated by the arrival wave replica generating unit from the received signal.

(3) Moreover, in the above described reception device, wherein the time period setting unit sets the each time periods based on total number of the received power of the received signal which is included in each time period when the received signal is divided in a plurality of time periods and predetermined number.

(4) Moreover, in the above described reception device, wherein the time period setting unit sets each time period referencing a minimum value of total of a received power of the received signal which is included in predetermined time.

(5) Moreover, in the above described reception device, wherein the time period setting unit uses a guard interval length as the predetermined time.

(6) Moreover, in the above described reception device, wherein the time period setting unit sets time period which is minimum difference between a total number of the received power of the received signal which is included in each time period when the received signal is divided into a plurality of time periods and the predetermined power as each time periods.

(7) Moreover, in the above described reception device, wherein the time period setting unit sets the difference between a total of the received power of the received signal which is included in each time periods when the received signal is divided in a plurality of time periods and the predetermined power which is less than predetermined power as the time period abstracted by the received signal abstracting unit.

(8) According to another aspect of the present invention, there is provided a reception device comprising: a replica signal generating unit which generates a replica signal which is a replica of a transmitted signal based on a received signal; a group setting unit which divides the received signal based on a predetermined time, and separates each time period into groups based on a received signal power which is included in the divided each time periods; an arrival wave removing unit which removes the arrival wave from each group set by the group setting unit using the replica signal generated by the replica signal generating unit; a combining unit which combines the signals from which the arrival wave is removed by the arrival wave removing unit from each time periods set by the time period setting unit; and a demodulation processing unit which performs a demodulation process for the signal combined by the combining unit.

(9) Moreover, in the above described reception device, wherein the group setting unit sequences each time period which is divided based on the predetermined time based on a size of the received signal which is included in each time period, and sets a large power received signal and a small received signal to same group.

(10) Moreover, in the above described reception device, wherein the group setting unit separates into groups to minimize the difference between a total of the received power of the received signal which is included in each group and a predetermined power when each time period which is divided based on a predetermined time.

(11) According to another aspect of the present invention, there is provided a reception method comprising: a replica signal generating step which generates a replica signal which is a replica of a transmitted signal based on a received signal; a time period setting step which sets a plurality of time periods which time period of the received signal is divided into based on a received power of the received signal; an arrival wave removing step which removes an arrival waves from the received signal for each time periods set in the time period setting step using the replica signal generated in the replica signal generating step; a combining step which combines the signal which the arrival wave is removed in the arrival wave removing step from each time periods set in the time period setting step; and a demodulation processing step which performs a demodulation process for the signal combined in the combining step.

(12) According to another aspect of the present invention, there is provided a reception method comprising: a replica signal generating step which generates a replica signal from which is a replica of a transmitted signal based on a received signal; a group setting step which divides the received signal based on a predetermined time, and separates each time period into groups based on a received signal power which is included in each divided time period; an arrival wave removal abstracting step which removes the arrival wave from each group set in the group setting step using the replica signal generated in the replica signal generating step; a combining step which combines the signals which the arrival wave is removed in the arrival wave removing step from each time periods set in the time period setting step; and a demodulation processing step which performs a demodulation process for the signal combined in the combining step.

Effect of the Invention

In the present invention, it is possible to perform a FFT on the signal which is removed arrival wave every predetermined time period based on the received power of the received signal at the reception device. Therefore, it is possible to decrease the inter symbol interference and the inter carrier interference. Then, FFT is performed when a long delay wave arrives, it is possible to decrease inter symbol interference and inter carrier interference. Therefore, it is possible to decrease the calculation during the demodulation the signal received by the reception device from the transmission device. Further, if a received signal is divided into a plurality of time periods based on the predetermined time periods, the total received power of the received signals which are included in each time period is not depleted than other time periods. Therefore, it is possible to much deplete the whole characteristics by decreasing one of great depletion of the replica accuracy. Then, it is possible to minimize the characteristics depletion by the replica error.

In addition, it is possible to perform an inverse diffusion process for the signal which reduces the frequency selectivity by removing arrival waves, and it is possible to remove the multi code interference using calculation quantity which is not related to the code number.

REFERENCE SYMBOLS

| | |
|---|---|
| 1 | S/P converting unit, |
| 2-1 to 2-4 | every code signal processing unit, |
| 3 | error correction coding unit, |
| 4 | bit interleaving unit, |
| 5 | demodulating unit, |
| 6 | symbol interleaving unit, |
| 7 | frequency time diffusing unit, |
| 8 | DTCH multiplexing unit, |
| 9 | PICH multiplexing unit, |
| 10 | scrambling unit, |
| 11 | IFFT unit, |
| 12 | GI inserting unit, |
| 21 | symbol synchronizing unit, |
| 22 | channel and noise power estimating unit, |
| 723 | MAP detecting unit, |
| 24-1 to 24-4 | every code MAP decoding unit, |
| 28 | replica signal generating unit, |
| 29-1 to 29-4 | every code symbol generating unit, |
| 30 | bit interleaving unit, |
| 31 | symbol generating unit, |
| 32 | symbol interleaving unit, |
| 33 | frequency time diffusing unit, |
| 34 | DTCH multiplexing unit, |
| 35 | PICH multiplexing unit, |
| 36 | scrambling unit, |
| 37 | IFFT unit, |
| 38 | GI inserting unit, |
| 39 | P/S converting unit, |
| 42 | adding unit, |
| 43 | GI removing unit, |
| 44 | FFT unit, |
| 45-1 to 45-3 | soft canceller block unit, |
| 46 | MMSE filtering unit, |
| 47-1 to 47-4 | every code log likelihood ratio outputting unit, |
| 48 | inverse diffusing unit, |
| 49 | symbol de-interleaving unit, |
| 50 | soft decision outputting unit, |
| 61 | channel estimating unit, |
| 62 | preamble replica generating unit, |
| 63 | noise power estimating unit, |
| 741 | arrival wave replica generating unit, |
| 751, 851, 951 | divisional interval setting unit, |
| 7511 | signal power calculating unit, |
| 7512 | block power setting unit, |
| 7513 | divisional time deciding unit, |
| 8511 | pass dividing unit, |
| 8512 | divisional interval power measuring unit, |
| 8513 | grouping unit, |
| 9511 | standard power calculating unit, |
| 9512 | divisional time deciding unit |

BEST MODE FOR CARRYING OUT THE INVENTION

First Embodiment

First, a communication system according to a first embodiment of the present invention is described. The communication system includes a wireless transmission device and a wireless reception device.

Figure 1:
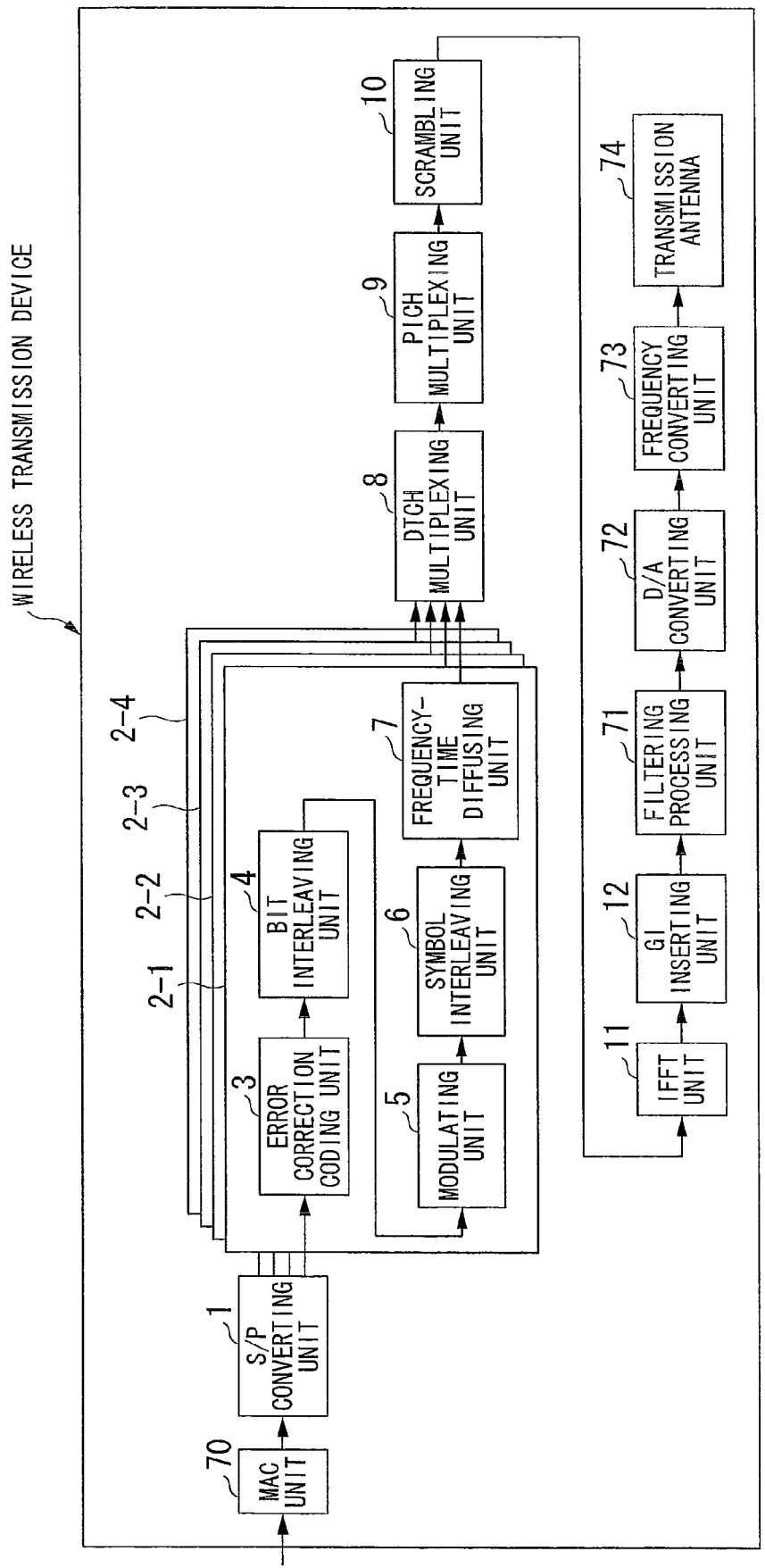
FIG. 1 is a schematic block diagram showing a configuration of a wireless transmission device according to a first embodiment of the present invention.

FIG. 1 is a schematic block diagram showing a configuration of a wireless transmission device according to a first embodiment of the present invention. The wireless transmission device includes a S/P (Serial/Parallel) converting unit 1, every code signal processing units 2-1 to 2-4, a DTCH (Data Traffic Channel) multiplexing unit 8, a PICH (Pilot Channel) multiplexing unit 9, a scrambling unit 10, an IFFT (Inverse Fast Fourier Transform) unit 11, and a GI inserting unit 12. Each of the every code signal processing units 2-1 to 2-4 includes an error correction coding unit 3, a bit interleaving unit 4, a modulating unit 5, a symbol interleaving unit 6 and a frequency time diffusing unit 7.

A MAC (Media Access Control) unit 70 supplies information signal to the S/P converting unit 1. The output signals which performed serial parallel conversion by the S/P converting unit 1 are supplied to the every code signal processing units 2-1 to 2-4. In addition, the configurations of the every code signal processing units 2-2 to 2-4 are the same as that of the every code signal processing unit 2-1. Therefore, only the every code signal processing unit 2-1 is described below.

The signal supplied to the every code signal processing unit 2-1 is performed an error correction coding process (for example, a turbo coding, a LDPC (Low Density Parity Check) coding or convolution coding). The output signal of the error correction coding unit 3 is replaced to suitable sequence for every bits based on the depletion of the received power by frequency selectivity fading to improve an occurrence of the burst error, and is outputted.

The output signal of the bit interleaving 4 is performed a symbol modulation process (for example, BPSK (Binary Phase Shift Keying), QPSK (Quadrature Phase Shift Keying), 16 QAM (16 Quadrature Amplitude Modulation), or 64 QAM (64 Quadrature Amplitude Modulation)) by the modulating unit 5.

The output signal of the modulating unit 5 is replaced to suitable sequence for every symbols to improve the burst error by the symbol interleaving unit 6. The output signal of the symbol interleaving unit 6 is diffused using predetermined diffusion code (channelization code) by the frequency time diffusing unit 7. Here, as diffusion code, the OVSF (Orthogonal Variable Spread Factor) is used. However, another diffusion code may be used.

In addition, the wireless transmission device includes a code multiplex number $C_{mux}$ ($C_{mux}$ is natural number which is 1 or greater than 1) of every code signal processing unit. Here, $C_{mux}$ is four ($C_{mux}$=4). The signals which were diffused by different diffusion codes are supplied as the output signals of every code signal processing units 2-1 to 2-4 and multiplexed (adding process) by the DTCH multiplexing unit 8. Then, in the PICH multiplexing unit 9, the PICH which is used for channel estimation is inserted in a predetermined position (time multiplexing).

Then, the signal is performed scrambling with the scrambling code which is peculiar to the base station device by the scrambling unit 10, and is performed a frequency time conversion by the IFFT unit 11. Then, the signal is inserted into the guard interval by the GI inserting unit 12, and is performed a filtering process by the filtering unit 71, and is performed a digital analog conversion by the D/A (Digital/Analog) converting unit 72, and is performed a frequency conversion process by the frequency converting unit 73, and is transmitted as the transmitted signal from the transmission antenna 74 to the wireless reception device.

In FIG. 1, the every code signal processing units 2-1 to 2-4 includes both of the bit interleaving unit 4 and the symbol interleaving unit 6. However, only one of them may be included. In addition, the every code signal processing units 2-1 to 2-4 may not include both of the bit interleaving unit 4 and the symbol interleaving unit 6.

Figure 2:
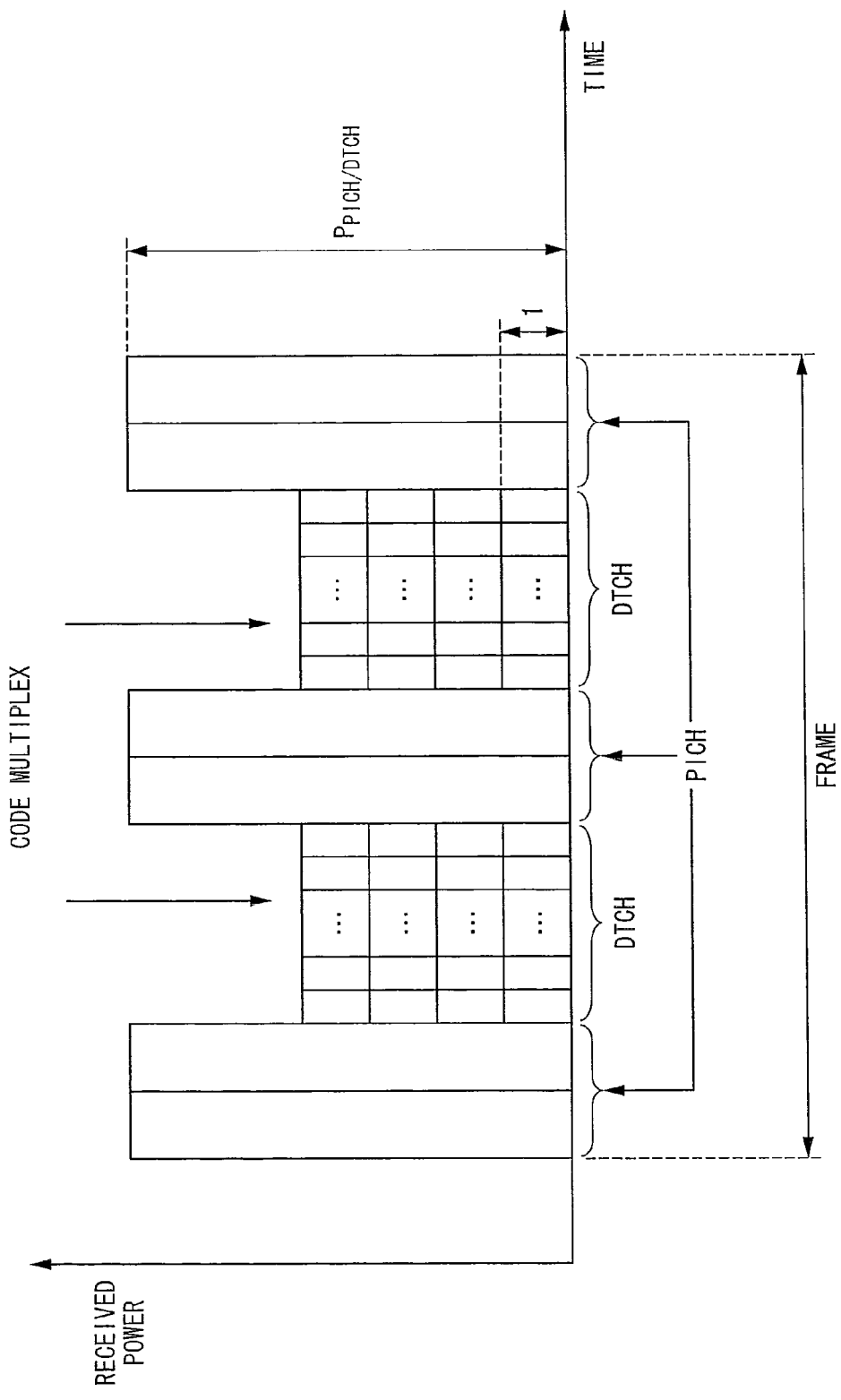
FIG. 2 is a diagram showing an example of frame format according to the first embodiment of the present invention.

FIG. 2 is a diagram showing an example of frame format according to the first embodiment of the present invention. FIG. 2 indicates the frame format of multi-carrier signal transmitted from the wireless transmission device to the wireless reception device. In FIG. 2, the horizontal axis indicates time, and the longitudinal axis indicates received power. As shown in FIG. 2, the pilot channels (PICH) are arranged in the forward, latter and middle portions. The data traffic channels (DTCH) are arranged in the forward and latter portions, and the signals which were diffused by $C_{mux}$ different diffusion codes are multiplexed. Here, the state that four data are piled when $C_{mux}$ is four ($C_{mux}=4$) is shown typically. In addition, the ratio every one code of the received power of the pilot channel (PICH) and the received power of the data traffic channel (DTCH) is shown as PPICH/DTCH.

Figure 3:
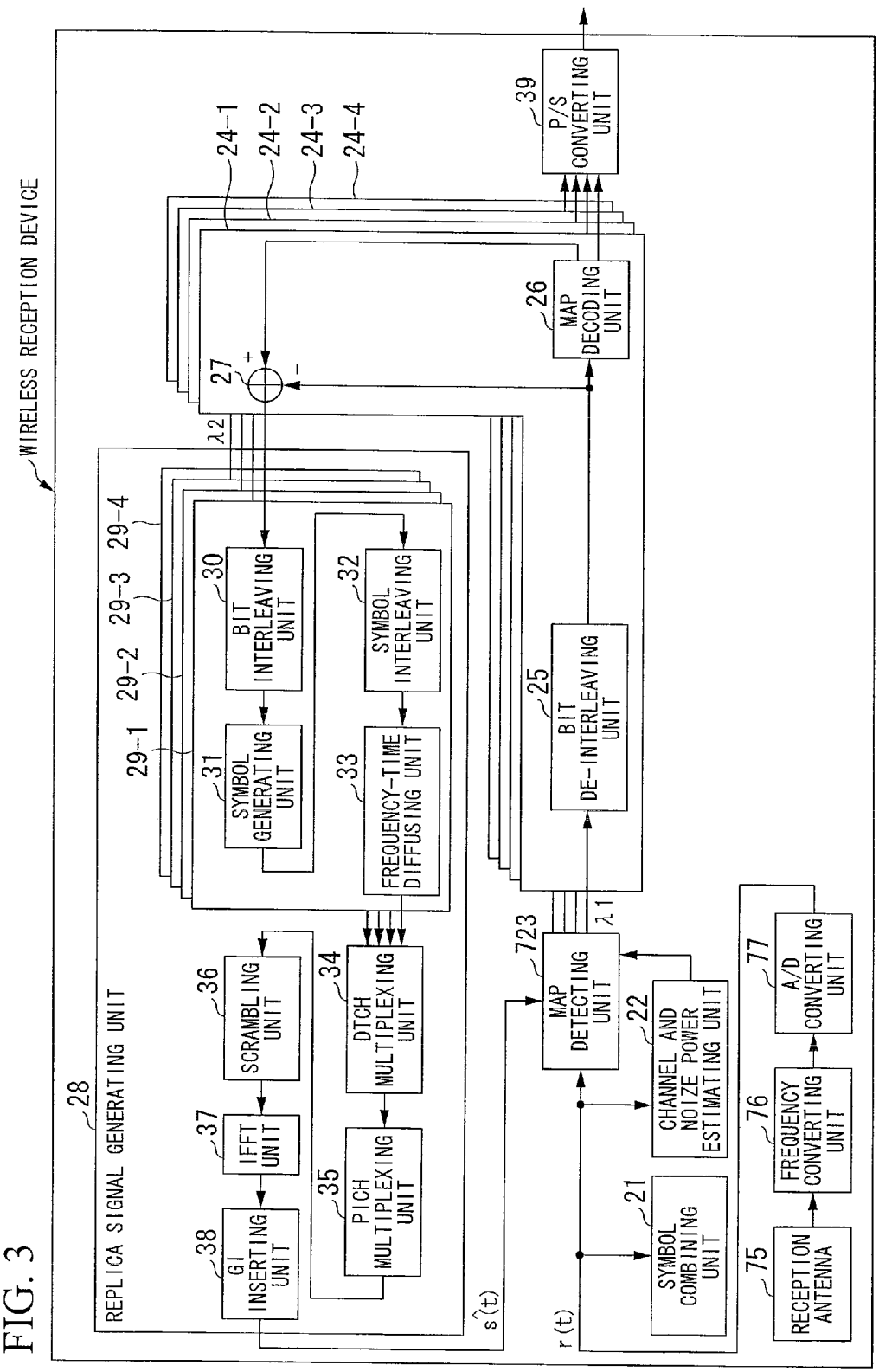
FIG. 3 is a schematic block diagram showing a configuration of a wireless reception device according to the first embodiment of the present invention.

FIG. 3 is a schematic block diagram showing the configuration of a wireless reception device according to the first embodiment of the present invention. The wireless reception device includes a reception antenna 75, a frequency converting unit 76, an A/D converting unit 77, a symbol synchronizing unit 21 a channel and noise power estimating unit 22a, a MAP detecting unit 723 (also called signal detecting unit), every code MAP decoding units 24-1 to 24-4 (also called every code decoding unit), a replica signal generating unit 28, and a P/S (Parallel/Serial) converting unit 39.

The replica signal generating unit 28 includes every code symbol generating units 29-1 to 29-4, a DTCH multiplexing unit 34, a PICH multiplexing unit 35, a scrambling unit 36, an IFFT unit 37 and a GI inserting unit 38. The replica signal generating unit 28 generates the replica signal which is a replica of a transmitted signal transmitted by the wireless transmission device (FIG. 1) based on the received signal.

The replica signal generating unit 28 generates a replica signal which is a replica of the transmitted signal based on the digital received signal r(t). Specifically, the replica signal generating unit 28 generates the replica signal which is a replica of the transmitted signal based on the log likelihood ratio calculated by the MAP decoding unit 26 (also called a decoding unit).

The every code symbol generating units 29-1 to 29-4 include a bit interleaving unit 30, a symbol generating unit 31, a symbol interleaving unit 32, and a frequency time diffusing unit 33. The every code MAP decoding unit 24-1 includes a bit de-interleaving unit 25, a MAP decoding unit, and an adding unit 27. The every code MAP decoding units 24-2 to 24-4 are the same as the every code MAP decoding unit 24-1.

In addition, the MAP decoding unit 26 performs a decoding process for the error correction coding unit 3 of the wireless transmission device. If an error correction coded signal is able to be decoded, the MAP decoding unit 26 is not limited to the aforementioned configuration.

The received signal received by the reception antenna 75 is performed a frequency conversion process by the frequency converting unit 76, and is performed an analog digital conversion process by the A/D (Analog/Digital) converting unit 77, and is performed a symbol synchronization as the digital received signal r(t) by the symbol synchronizing unit 21. In the symbol synchronizing unit 21, a symbol synchronization is performed using a correlation of the guard interval (GI) and the effective signal interval, and is performed after signal process based on the result thereof.

Figure 4:
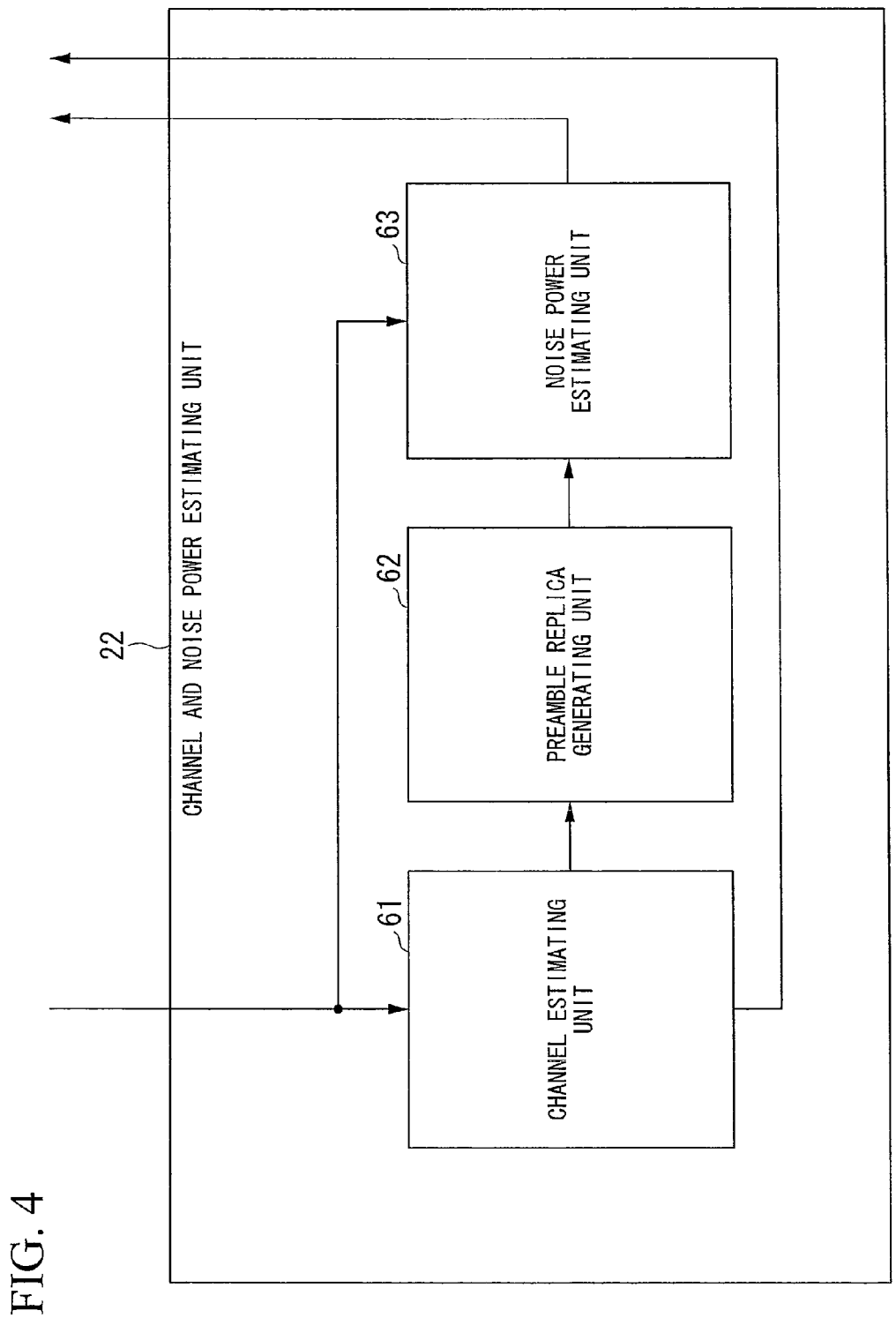
FIG. 4 is a diagram showing a configuration of a channel and noise power estimating unit 22 (FIG. 3) according to the first embodiment of the present invention.

FIG. 4 is a diagram showing a configuration of a channel and noise power estimating unit 22 (FIG. 3) according to the first embodiment of the present invention. The channel and noise power estimating unit 22 includes a channel estimating unit 61, a preamble replica generating unit 62 and a noise power estimating unit 63.

The channel estimating unit 61 estimates a channel impulse response using the pilot channel (PICH) which is included in the received signal. The preamble replica generating unit 62 generates a replica signal of the pilot channel (PICH) using the channel impulse response estimation value calculated by the channel estimating unit 61 and waveform of the pilot channel (PICH) which is known information. The noise power estimating unit 63 estimates a noise power by calculating the difference between the pilot channel (PICH) which is included in the received signal and the replica signal of the pilot channel (PICH) supplied from the preamble replica generating unit 62

In addition, as a channel estimation method in the channel estimating unit 61, a calculating method based on a minimum mean square error using an RLS algorithm or a method using a frequency correlation may be used.

Return to the explanation of FIG. 3, the channel impulse response and the noise power estimating value supplied from the channel and noise power estimating unit 22 are supplied to the MAP detecting unit 723 (maximum a posteriori probability detector, using a maximum posteriori probability (MAP) (after-mentioned)), and are used to calculate a log likelihood ratio for every bit.

When a first process is performed, the MAP detecting unit 723 outputs the log likelihood ratio of every bit using the received signal, the channel impulse response and the noise power estimation value. The log likelihood ratio, which indicates whether the received bit probably is 0 or 1, is calculated based on the bit error rate of the communication pass. In FIG. 3, four output signals are respectively supplied to the every code MAP decoding units 24-1 to 24-4. The every code MAP decoding units 24-1 to 24-4 output log likelihood ratio of bits which were each assigned to different diffusion codes. If the code multiplexing is performed using the different $C_{mux}$ diffusion codes, the $C_{mux}$ output signals are supplied to the every code MAP decoding units 24-1 to 24-$C_{mux}$.

If a repeated process is performed, the log likelihood ratio of every bit is supplied based on the received signal, the replica signal obtained by the demodulation process, the channel impulse response, and the noise power estimation value.

Next, in the every code MAP decoding units 24-1 to 24-4, the bit de-interleaving unit 25 performs the de-interleave process for every bit to the inputted signals. The de-interleaving process is a reverse process of an interleaving process. In the de-interleaving process, the replaced sequence is returned to original sequence. The output signal of the bit de-interleaving unit 25 is performed a MAP decoding process by the MAP decoding unit 26. Specifically, the MAP decoding unit 26 performs an error correction decoding based on the result which was performed the soft decision by the soft decision outputting unit 50 (FIG. 5, after-mentioned), and calculates a log likelihood ratio for every bit. In addition, the MAP decoding process is a method that hard decision is not performed when normal error correction decoding (for example, a turbo decoding, a LDPC decoding, a viterbi decoding) is performed, but a soft decision result of log likelihood ration which includes an information bit and parity bit is outputted. In other words, in the hard decision, the received signal is determined to be zero or one. However, in the soft decision, the received signal is determined based on the information that how positive seem to be.

The adding unit 27 calculates a difference between the input signal of the MAP decoding unit 26 and the output signal of the MAP decoding unit 26, and supplied the result to the replica signal generating unit 28.

The input signal of the replica signal generating unit 28 is inputted to the bit interleaving unit 30, and the bit interleaving unit 30 replaces λ2 for every bits and supplies it. In the symbol generating unit 31, the output signal of the bit interleaving unit 30 is performed a symbol modulation process using the modulation (for example, BPSK, QPSK, 16 QAM or 64

QAM) which is the same as the wireless transmission device based on the size of λ2. The output signal of the symbol generating unit 31 is replaced the sequence for every symbol by the symbol interleaving unit 32. The output of the symbol interleaving unit 32 is diffused using the predetermined diffusion code (channelizatoin code) by the frequency time diffusing unit 33.

In addition, the wireless reception device includes a code multiplexing number $C_{mux}$ of the every cod MAP decoding units and the every code symbol generating units. Here, $C_{mux}$ is four ($C_{mux}$=4). The signals diffused using different diffusion codes are supplied from the every code replica generating units 29-1 to 29-4, and are multiplexed (adding process) by the DTCH multiplexing unit 34. Next, in the PICH multiplexing unit 35, the pilot channel (PICH) which is used for a channel estimation is inserted (time multiplexing) in the predetermined position. Next, the signal is performed a scrambling using the scrambling code which is peculiar to the base station device by the scrambling unit 36, and performed a frequency time conversion by the IFFT unit 37, is inserted into the guard interval (GI) by the GI inserting unit 38, is supplied to the MAP detecting unit 723, and is used in the signal process of repeated process.

In addition, after the repeated decoding process is performed a predetermined number of times, the output signal of the MAP decoding unit 26 is supplied to the P/S converting unit 39, and is performed a parallel serial conversion, and is supplied to a MAC unit not shown) as the demodulating result.

Figure 5:
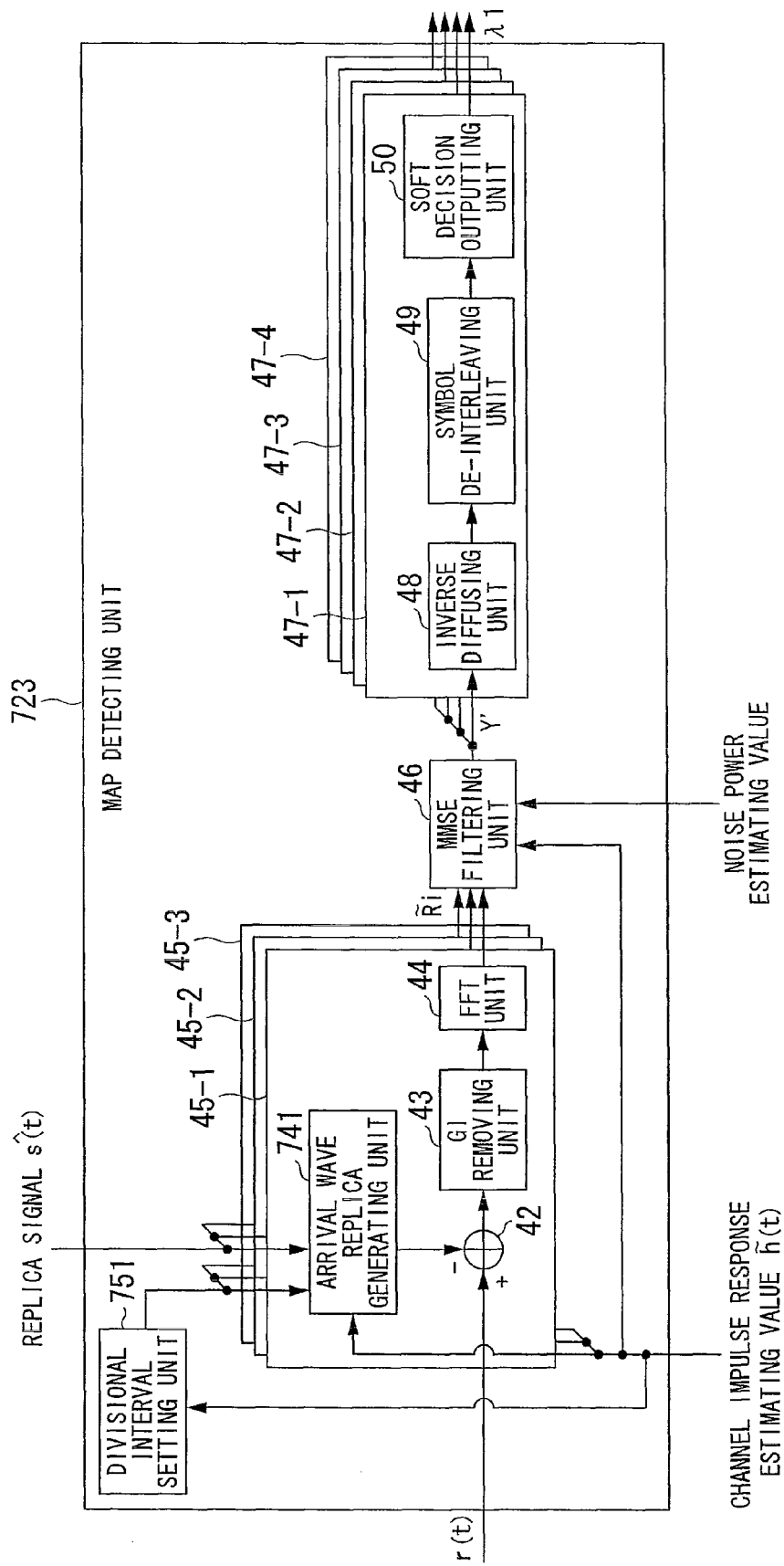
FIG. 5 is a diagram showing an example of a MAP detecting unit 723 (FIG. 3) according to the first embodiment of the present invention.

FIG. 5 is a diagram showing an example of a MAP detecting unit 723 (FIG. 3) according to the first embodiment of the present invention. The MAP detecting unit 723 includes soft canceller block units 45-1 to 45-3 (also called arrival wave removing units), a MMSE (Minimum Mean Square Error) filtering unit 46 (also called a synchronizing unit), every code log likelihood ratio outputting units 47-1 to 47-4 (also called demodulating processing units), a divisional interval setting unit 751 (also called a time period setting unit).

The soft canceller block units 45-1 to 45-3 include an arrival replica generating unit 741, an adding unit (also called a subtracting unit), a GI removing unit 43, and an FFT unit 44. The soft canceller block units 45-1 to 45-3 abstracts the received signals of time periods which are set by the divisional interval setting unit 751 using the replica signals generated by the replica signal generating unit 28 by removing the arrival wave from the received signal for each time period which is set by the divisional interval setting unit 751.

The divisional interval setting unit 751 sets a plurality of time periods which were divided the time period of the received signal based on the received power of the received signal. Specifically, each of the soft canceller block units 45-1 to 45-3 removes the non-predetermined arrival wave using the replica signals generated by the replica signal generating unit 28. Therefore, the divisional interval setting unit 751 sets the time periods which are used when the arrival wave is divided into blocks based on the channel impulse response estimation value. Then, the divisional interval setting unit 751 supplies the set time periods to the arrival wave replica generating unit 741.

Figure 6:
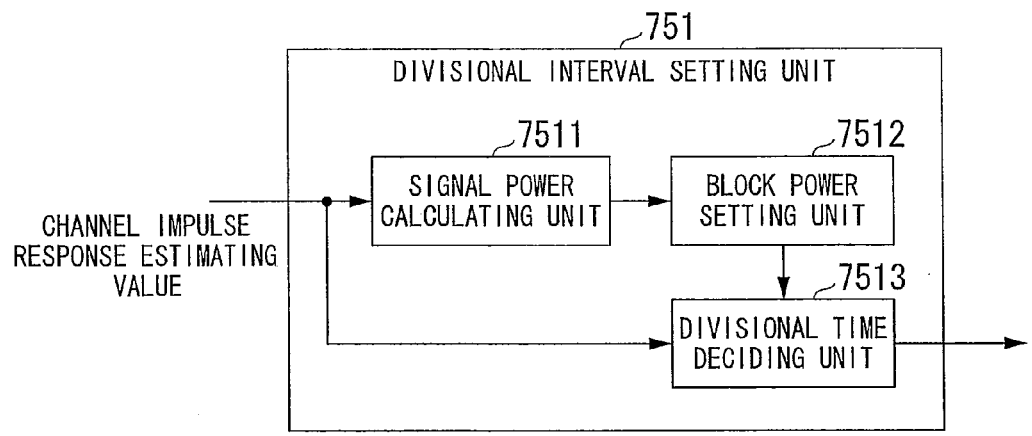
FIG. 6 is a diagram showing a configuration of a divisional interval setting unit 751 (FIG. 5) according to the first embodiment of the present invention.

FIG. 6 is a diagram showing a configuration of a divisional interval setting unit 751 (FIG. 5) according to the first embodiment of the present invention. The divisional interval setting unit 751 includes a signal power calculating unit 7511, a block power setting unit 7512, and a divisional time deciding unit 7513.

The signal power calculating unit 7511 calculates the power of the received signal from the channel impulse response estimation value which is a channel estimation value.

Figure 7:
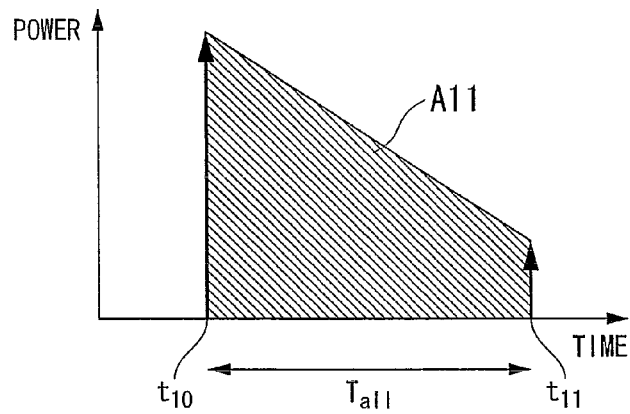
FIG. 7 is an explanatory diagram showing a power calculation method used by a signal power calculating unit 7511 (FIG. 6) according to the first embodiment of the present invention.

FIG. 7 is an explanatory diagram showing a power calculation method used by a signal power calculating unit 7511 (FIG. 6) according to the first embodiment of the present invention. FIG. 7 indicates a channel impulse response estimation value when the channels are estimated that there is a arrival wave from the time t10 which is first received signal r(t) arrived to the time t11. The time t11 is later time Ta11 than the time t10. In FIG. 7, the horizontal axis is time, and the longitudinal axis is power. In the signal power calculating unit 7511, during the time Ta11 that the arrival wave exists, the received signal power is calculated by integrating along to the time axis. The area A11 shown diagonal line in FIG. 7 is calculated as the received signal power Pa11.

In FIG. 7, when an arrival wave exists, the received power is calculated by integrating. However, if it is possible to calculate the total power, another method may be used. For example, the total power value of sample points of time axis may be received power. In addition, The received power calculating value of an RSSI (Received Signal Strength Indicator) may be used.

Return to the explanation of FIG. 6, the block power setting unit 7512 sets each time periods based on the received power of the received signals and the divisional number B (also called predetermined number) which are included in each time periods when the received signal is divided into a plurality of time periods. Specifically, the block power setting unit 7512 sets the signal power value which is abstracted by the soft canceller block units 45-1 to 45-3 based on received signal power calculated by the signal power calculating unit 7511 and the predetermined divisional number B of the arrival wave. If the received signal power which is calculated by the signal power calculating unit 7511 is Pa11, the signal power value which is abstracted by the soft canceller block units 45-1 to 45-3 is Pa11/B.

In the divisional time deciding unit 7513, calculates time width (time period) that each divided block's signal power is abstracting signal power value based on the channel impulse response and the abstracting signal power value (Pa11/B), and outputs the calculated time width to the arrival wave replica generating unit 741 (FIG. 5).

Figure 8:
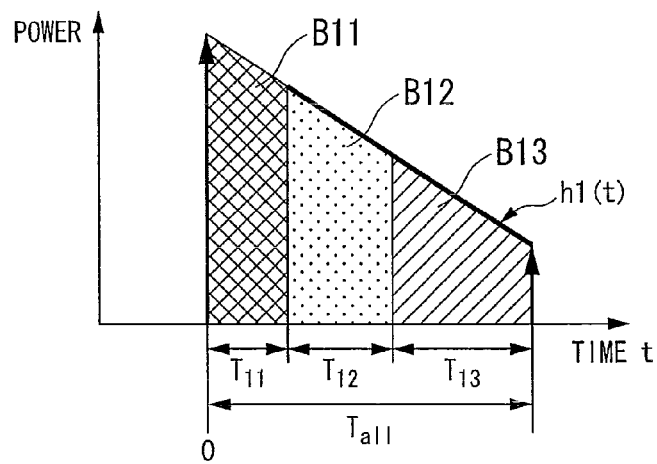
FIG. 8 is an explanatory diagram showing a calculation method of time width which divides a channel impulse response estimation value based on an abstraction signal power value by a divisional time deciding unit 7513 (FIG. 6) according to the first embodiment of the present invention.

FIG. 8 is an explanatory diagram showing a calculation method of time width which divides a channel impulse response estimation value based on an abstraction signal power value by a divisional time deciding unit 7513 (FIG. 6) according to the first embodiment of the present invention. In FIG. 8, the horizontal axis is time, and the longitudinal axis is power. In FIG. 8, the predetermined divisional number of arrival wave is three (B=3). As shown in FIG. 8, the division of the channel impulse response estimation value is performed with the time width that each divided block's power is Pa11/3. T11, T12 and T13 in FIG. 8 indicate the impulse response time width that each block's power is Pa11/3. Area B11, area B12 and area B13 in FIG. 8 are blocks which correspond to time width T11, T12 and T13 which are divided.

The arrival wave replica generating unit 741 (FIG. 5) generates each a replica of the arrival wave based on the channel impulse response estimation value that is a received signal's channel estimation value, the replica signal generated by the replica signal generating unit 28 and the time T11, T12 and T13 set by the divisional time setting unit 751. The soft canceller block unit 45-1 (FIG. 5) of the arrival wave replica generating unit 741 performs a convolution calculation using the impulse response H1(*t*) of the blocks B12 and B13 and the replica signal S^(t), and outputs the value to the adding unit 42. Here, T11≦t≦(T11+T12+T13).

The envelope line of B12 and B13 in FIG. 8 is h1(*t*). Similarly, the impulse response h2(*t*) performed the convolution calculation by the arrival wave replica generating unit 741 of the soft canceller block unit 45-2 (FIG. 5) is the envelop line of the block B11 and the block B13. Then, the impulse response h13(*t*) performed the convolution calculation by the arrival wave replica generating unit 741 of the soft canceller block unit 45-3 (FIG. 5) is the envelop line of the block B11 and the block b12.

The adding unit 42 of the soft canceller block unit 45-1 abstracts the received signal of the time periods set by the divisional interval setting unit 751 by subtracting the replica of the arrival wave of each time period generated by the arrival wave replica generating unit 741 from the received signal. Specifically, the signal which is a convolution calculation result of the impulse response h1(*t*) and the replica signal S^(t) is subtracted from the received signal r(t). Similarly, in the adding unit 42 of the soft canceller block unit 45-2, the signal which is convolution calculation result of the impulse response h2(*t*) and the replica signal S^(t) is subtracted from the received signal r(t). In addition, in the adding unit 42 of the soft canceller block unit 45-3, the signal which is convolution calculation result of the impulse response h3(*t*) and the replica signal S^(t) is subtracted from the received signal r(t).

As described above, it is possible to prevent a rapid deterioration of the SINR during the predetermined signal interval of each soft canceller block units 45-1 to 45-3 by performing the block dividing such that the received signal power of a predetermined signal interval abstracted by each soft canceller block units 45-1 to 45-3. Therefore, it is possible to prevent a rapid deterioration of the accuracy of the replica generated by the arrival wave replica generating unit 741 and the removal remainder in the soft canceller block units 45-1 to 45-3. Therefore, it is possible to prevent the depletion of the replica accuracy during a certain interval becomes the depletion of whole characteristics, and it is possible to minimize the characteristics depletion based on the replica error.

In the aforementioned explanation, the channel impulse response estimation value is divided into blocks using the time width which has equal power. A similar effect is obtained by determining the divisional time such that the power difference between each divisional block which is divided using the time width which is almost zero or which is divided using the aforementioned method is less than the predetermined value which is not affect to each blocks. Therefore, for example, if the impulse response value is used which was performed a sampling (for example, digital processing), it is possible to use the aforementioned method.

In addition, in the first embodiment, the divisional number of the arrival wave is determined in advance. However, the divisional number of the arrival wave, for example, may be determined to be shorter than the guard interval length.

In FIG. 5, the soft canceller block units 45-1 to 45-3 removes the non-predetermined wave elements from the received signal r(t) based on the time width information outputted by the divisional interval setting unit 751, using the replica signal generated by the replica signal generating unit 28, and abstracts the predetermined signal elements of the predetermined time of each soft canceller block unit. The arrival wave replica generating unit 741 generates the replica of the arrival elements (the non-predetermined signal elements) which are not included in the predetermined time period among the received signal based on the channel impulse response estimation value which is the channel estimation value estimated from the received signal r(t) and the replica signal s^(t) generated by the replica signal generating unit 28 (FIG. 3). The adding unit 42 subtracts the replica of the arrival wave generated by the arrival wave replica generating unit 741 from the received signal r(t).

The every code log likelihood ratio outputting units 47-1 to 47-4 each include an inverse diffusing unit 48, a symbol de-interleaving unit 49, and a soft decision outputting unit 50, and performs the demodulation process to the signal combined by the soft canceller block units 45-1 to 45-3.

With respect to the received signal r(t) supplied to the MAP detecting unit 723, the difference between the replica signal s^(t) supplied to the MAP detecting unit 723 and the output signal of the arrival wave replica generating unit 741 calculated from the channel impulse response estimation value h~(t) is calculated by the adding unit 43, and supplied to the GI removing unit 43. In the GI removal unit 43, the guard interval (GI) is removed and supplied to the FFT unit 44. The FFT unit 44 performs the time frequency conversion for the input signal, and obtains the signal R~i. In addition, the MAP detecting unit 723 includes B (B is an natural number which is equal to 1 or greater than 1) blocks of soft canceller block units. In addition, i is a natural number, and 1≦i≦B.

Next, the MMSE filtering unit 46 combines the signals of the predetermined time periods of each soft canceller block unit removed the non-predetermined signal and abstracted by the soft canceller block units 45-1 to 45-3. Specifically, the MMSE filtering unit 46 performs the MMSE filtering process using the output of the soft canceller block unit, the channel impulse estimation value, and the noise power estimation value, and the signal Y' is obtained.

In $C_{mux}$ ($C_{mux}$=4) of the every code log likelihood ratio outputting unit 47-1 to 47-4, supply the log likelihood ratio of every bit in each code using the signal Y'. In addition, the signal inputted to the every code log likelihood ratio outputting units 47-1 to 47-4 is the signal which is performed the de-scramble process to the signal Y' for the scrambling unit 10 of the transmission device 100.

The inverse diffusing unit 48 performs the inverse diffusing process using each diffusion code. The symbol de-interleaving unit 49 replace every symbol for the output of the inverse diffusing unit 48. The soft decision outputting unit 50 performs the soft decision to the signal synchronized by the MMSE filtering unit 46. The soft decision outputting unit 50 outputs the log likelihood ratio $\lambda 1$ for every bit for the output of the symbol de-interleaving as the soft decision determination result.

The soft decision outputting unit 50 calculates the log likelihood ratio $\lambda 1$ using the formulas (1) to (3) described below. In other words, if the output of n-th symbol of the symbol de-interleaving unit 49 is $Z_n$, the soft decision result $\lambda 1$ of the QPSK modulation represents the formulas (1) and (2) below.

[Number 1]

$$\lambda 1(b0) = \frac{2R[Zn]}{\sqrt{2}\,[1-\mu(n)]} \tag{1}$$

[Number 2]

$$\lambda 1(b1) = \frac{2\mathrm{Im}[Zn]}{\sqrt{2}\,[1-\mu(n)]} \tag{2}$$

Re [ ] indicates the real part in [ ], and Im [ ] indicates the imaginary part in [ ]. µ(n) indicates the standard symbol (amplitude of the pilot signal) of n symbol. In addition, the modulation signal represents the formula (3) below.

[Number 3]

$$Zn = \frac{1}{\sqrt{2}}(b0 + jb1) \quad (3)$$

In addition, in the aforementioned explanation, the QPSK modulation is used. Similarly, it is possible for other modulation systems to calculate the soft decision result (log likelihood ratio) λ1 for every bit.

In FIG. 3 and FIG. 5, the bit interleaving unit 30, the bit de-interleaving unit 25, and both of the symbol interleaving unit 32 and symbol de-interleaving unit 49 are provided. However, either of them may be provided. In other words, only the bit interleaving unit 30 and the bit de-interleaving unit 25 may be provided, or only the symbol interleaving unit 32 and the symbol de-interleaving unit 49 may be provided. In addition, the bit interleaving unit 30, the bit de-interleaving unit 25, the symbol interleaving unit 32 and the symbol de-interleaving unit 49 may not be provided.

Figure 9:
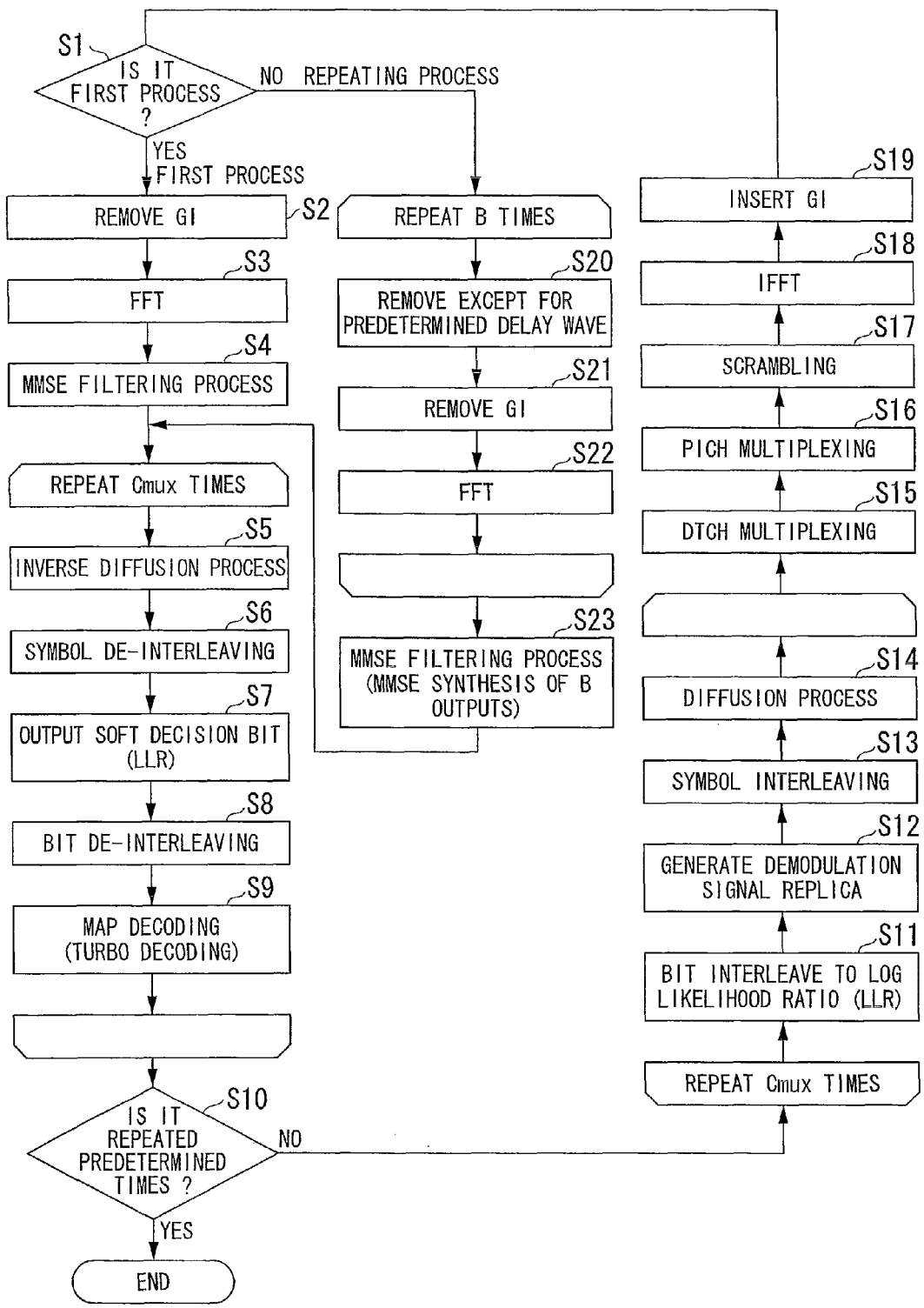
FIG. 9 is a flowchart showing an example of an operation of the wireless reception device according to the first embodiment of the present invention.

FIG. 9 is a flowchart showing an example of an operation of the wireless reception device according to the first embodiment of the present invention. The MAP detecting unit 723 determines whether or not a process is a first process (step S1). If it is determined that the process is the first process in step S1, the GI removing unit 43 removes the guard interval (GI) from the received signal r(t) (step S2). Then, the FFT unit 44 performs the FFT process (time frequency conversion process) (step S3). Next, the MMSE filtering unit 46 performs the normal MMSE filtering process (step S4).

Then, the inverse diffusion unit 48 performs the inverse diffusion process (step S5). Next, the symbol de-interleaving unit 49 performs the symbol interleaving process (step S6). Next, the soft decision outputting unit 50 performs the soft decision bit outputting process (step S7). Next, the bit de-interleaving unit 25 performs the bit de-interleaving process (step S8). Then, the MAP decoding unit 26 repeatedly performs the MAP decoding process (step S9). After the processes of the aforementioned steps S5 to S9 are repeatedly performed $C_{mux}$ times, it is determined whether or not the decoding process is repeatedly performed a predetermined number of times (whether or not the every code MAP decoding unit outputs the predetermined number λ2) (step S10), In addition, as described in FIG. 3, the process may be performed by the $C_{mux}$ of circuits provided in parallel. In addition, the MMSE process of first time is described below.

If it is determined that the processes of steps S5 to S9 are not performed repeatedly a predetermined number of times, the bit interleaving unit 30 performs the bit interleaving to the log likelihood ratio using the demodulation result λ2 of $C_{mux}$ codes (step S11). Then, the symbol generating unit 31 generates the modulation signal replica (step S12). Next, the symbol interleaving unit 32 performs the symbol interleaving process (step S13). Then, the frequency time diffusing unit 33 performs the diffusion process using the predetermined diffusion code (step S14).

After the processes of the aforementioned steps S11 to S14 are repeatedly performed $C_{mux}$ times, the DTCH multiplexing unit 34 performs the DTCH multiplexing process (step S15). Then, the PICH multiplexing unit 35 performs the PICH multiplexing process (step S16). Next, the scrambling unit 36 performs the scrambling process (step S17). Then, the IFFT unit 37 performs the IFFT process (step S18). Next, the GI inserting unit 38 inserts the guard interval (GI) (step S19). The signal inserted the GI in step S19 is a replica signal, and is used in the repeated demodulation process.

If it is determined that the process is a repeated process, in other words the process is not the first process, the soft canceller block units 45-1 to 45-3 removes except for the predetermined wave (include the direct wave) for every blocks (step S20). Then, the GI removing unit 43 performs the GI removing process (step S21). Next, the FFT unit 44 performs the FFT process (step S22). After the processes of the aforementioned steps S20 to S22 are performed for B (B is a natural number) blocks, the MMSE filtering unit 46 combines the output signals from the B blocks by the MMSE filter based on the minimum square error standard. In other words, the MMSE filtering process is performed (step S23). After the process of step S23, the process S5 is performed, and the process which is the same as the first process is performed.

Until it is determined in step S10—that the aforementioned processes are repeated a predetermined number of times, the processes of steps S1 to S9 and S11 to S23 are repeated.

Next, the process of the soft canceller block units 45-1 to 45-3 are specifically described. Among B blocks set by the divisional interval setting unit, the operation of the arrival wave replica generating unit 741 and the adding unit 42 of the i-th soft canceller block unit 45-i is described.

First, in the soft canceller block unit 45-i, the arrival wave replica generating unit 741 generates hi, and subtracts the value which is convoluted it and the replica signal sˆ(t) from the received signal r(t). This signal become the output of the adding unit 42. i (i≦B) is a natural number. The natural number B is describe below.

Figure 10:
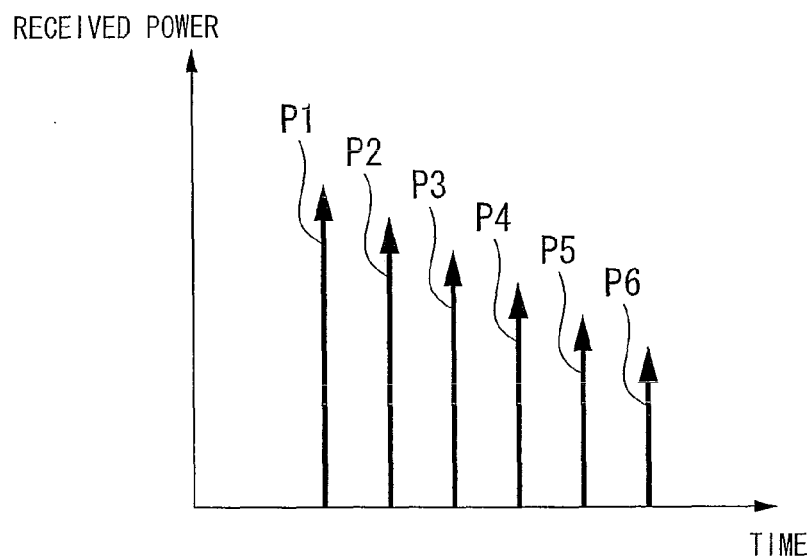
FIG. 10 is a diagram showing a channel impulse response estimation value according to the first embodiment of the present invention.

FIG. 10 is a diagram showing a channel impulse response estimation value according to the first embodiment of the present invention. The channel impulse response estimation value is obtained form the channel and noise power estimating unit 22. In addition, the six passes of the channel impulse response estimation values p1 to p6 are obtained. In FIG. 10, the horizontal axis is time, and the longitudinal axis is received power. In the soft canceller block units 45-1 to 45-3, the divisional interval setting unit outputs the time width to divide such that the three arrival waves which each includes two passes.

Figure 11:
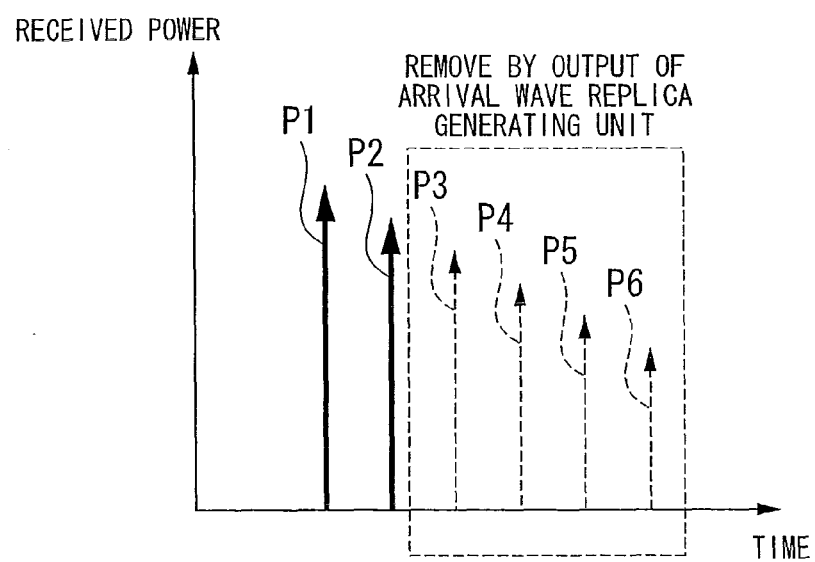
FIG. 11 is a diagram showing a channel impulse response estimation value in a soft canceller block unit 45-1 according to the first embodiment of the present invention.

FIG. 11 is a diagram showing a channel impulse response estimation value in a soft canceller block unit 45-1 according to the first embodiment of the present invention. In FIG. 11, the predetermined number of arrival waves (include the direct waves) at the soft canceller block unit 45-1 are shown the continuous line. In the soft canceller block unit 45-1, the third pass (p3), the fourth pass (0), the fifth pass (p5) and the sixth pass (p6) which are enveloped dotted line are defined as h1(t) and are generated by the arrival wave replica generating unit 741. The output of the arrival wave replica generating unit 741 is the value which is convoluted h1(t) and sˆ(t). The output of the adding unit 42 is the value subtracted the value which is convoluted h1(t) and sˆ(t) from the received signal r(t). In other words, if the replica is correctly generated, the output of the output of the adding unit 42 is regarded as the signal received via the channel which shown by (h(t)-h1(t)). Therefore, the signals p1 and p2 shown continuous line in FIG. 11 received via the channel become the outputs of the adding unit 42.

Figure 12:
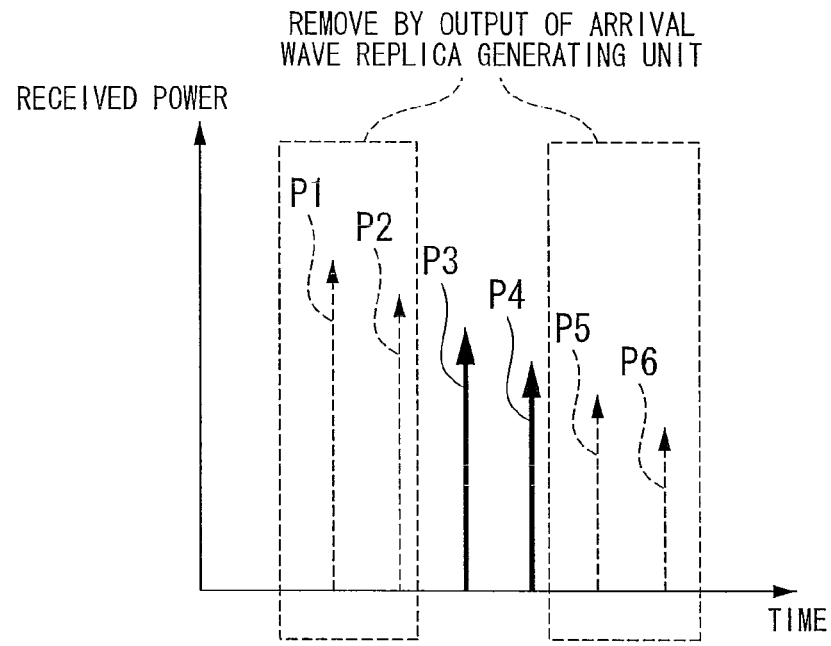
FIG. 12 is a diagram showing a channel impulse response estimation value in a soft canceller block unit 45-2 according to the first embodiment of the present invention.

FIG. 12 is a diagram showing a channel impulse response estimation value in a soft canceller block unit 45-2 according to the first embodiment of the present invention. In FIG. 12, the predetermined arrival waves (the predetermined waves) at the soft canceller block unit 45-2 are shown the continuous line. In the soft canceller block unit 45-2, the first pass (p1), the second pass (p2), the fifth pass (p5) and the sixth pass (p6) which are enveloped dotted line are defined as h2(t) and are generated by the arrival wave replica generating unit 741. The output of the arrival wave replica generating unit 741 is the value which is convoluted h2(t) and sˆ(t). The output of the adding unit 42 is the value subtracted the value which is convoluted h2(t) and sˆ(t) from the received signal r(t). In other words, if the replica is correctly generated, the output of the output of the adding unit 42 is regarded as the signal received via the channel which shown by (h(t)-h2(t)). Therefore, the signals p3 and p4 shown continuous line in FIG. 12 received via the channel become the outputs of the adding unit 42.

Figure 13:
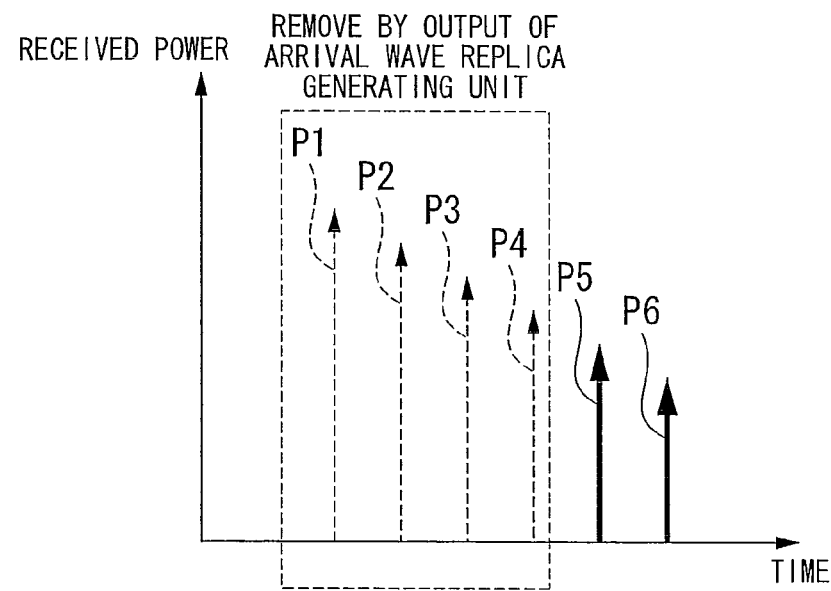
FIG. 13 is a diagram showing a channel impulse response estimation value in a soft canceller block unit 45-3 according to the first embodiment of the present invention.

FIG. 13 is a diagram showing a channel impulse response estimation value in a soft canceller block unit 45-3 according to the first embodiment of the present invention. In FIG. 13, the predetermined arrival waves (including the direct waves) at the soft canceller block unit 45-3 are shown the continuous line. In the soft canceller block unit 45-3, the first pass (p1), the second pass (p2), the third pass (p3) and the fourth pass (p4) which are enveloped dotted line are defined as h3(t) and are generated by the arrival wave replica generating unit 741. The output of the arrival wave replica generating unit 741 is the value which is convoluted h3(t) and sˆ(t). The output of the adding unit 42 is the value subtracted the value which is convoluted h3(t) and sˆ(t) from the received signal r(t). In other words, if the replica is correctly generated, the output of the output of the adding unit 42 is regarded as the signal received via the channel which shown by (h(t)-h3(t)). Therefore, the signals p5 and p6 shown continuous line in FIG. 13 received via the channel become the outputs of the adding unit 42.

Figure 14:
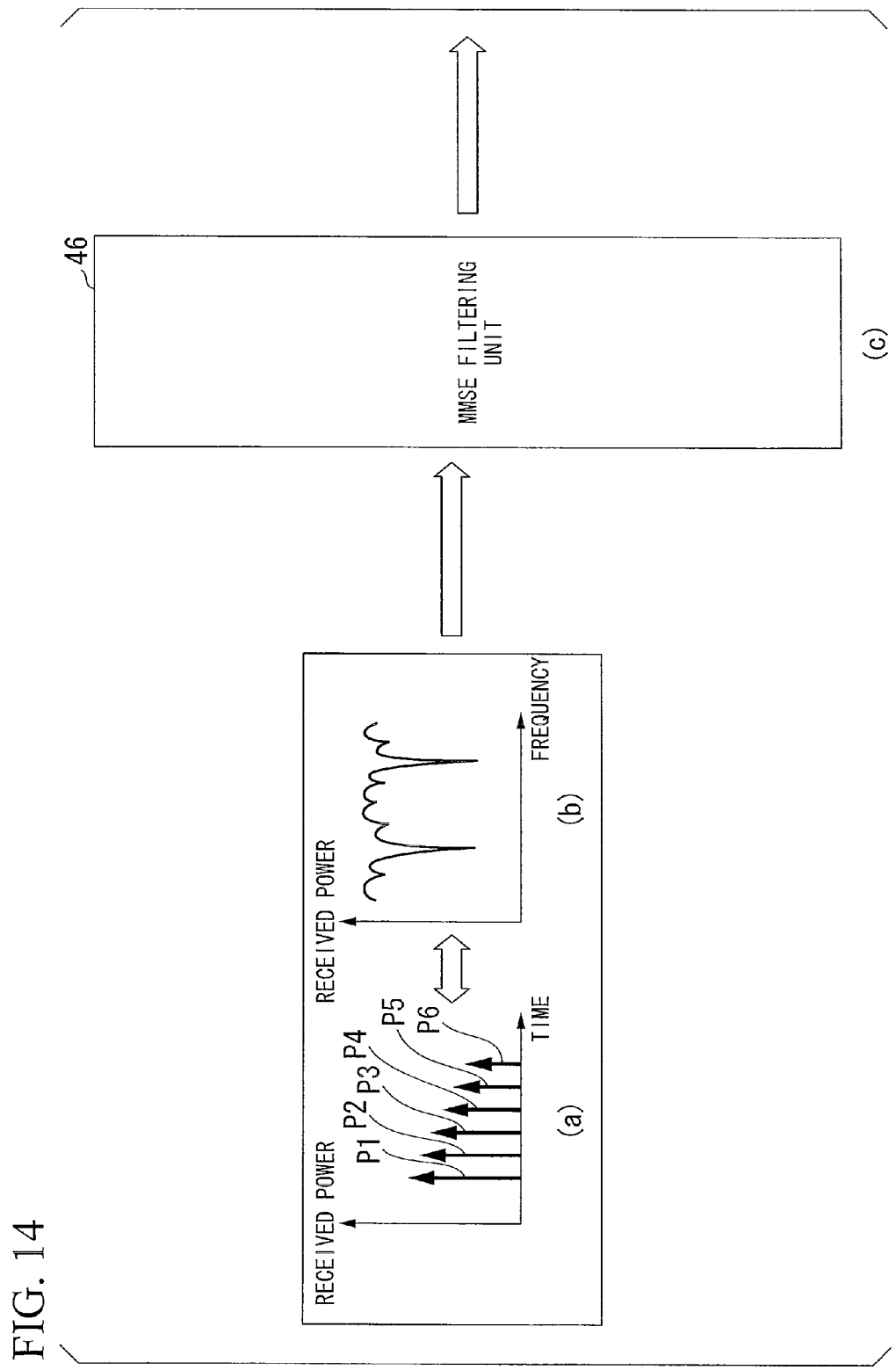
FIG. 14 is a diagram showing a channel impulse response estimation value in a first process and a MMSE filtering unit according to the first embodiment of the present invention.

FIG. 14(*a*) to FIG. 14(*c*) are diagrams showing a channel impulse response estimation value in a first process and a MMSE filtering unit according to the first embodiment of the present invention. The MMSE filtering unit 46 shown in FIG. 5 and processes of the step S4 and step S23 shown in FIG. 9 are described. First, the first process of the MMSE filtering unit 46 is described. If the received signal is represented in a frequency region, the received signal R is represented by the formula (4) below.

[Number 4]

$$R = \hat{H}S + N \quad (4)$$

Hˆ indicates a transfer function of an estimated channel. If only an arrival wave which is shorter than the guard interval (GI) exists, Hˆ represents an Nc-row by Nc-column diagonal matrix. In addition, Nc is a sub-carrier number of a spread-OFCDM. Hˆ is represented by the formula (5) below.

$$\hat{H} = \begin{pmatrix} \hat{H}_1 & & & 0 \\ & \hat{H}_2 & & \\ & & \ddots & \\ 0 & & & \hat{H}_{Nc} \end{pmatrix} \quad (5)$$

S indicates the transmission symbol. As shown in the formula (6), S is represented by an Nc-row by 1-column vector.

[Number 6]

$$S^T = (S_1, S_2, \ldots, S_{Nc}) \quad (6)$$

As shown in the formula (7) and the formula (8), the received signal R and the noise elements N are represented by an Nc-row by 1-column vector.

[Number 7]

$$R^T = (R_1, R_2, \ldots, R_{Nc}) \quad (7)$$

[Number 8]

$$N^T = (N_1, N_2, \ldots, N_{Nc}) \quad (8)$$

In the formulas (6) to (8), the suffix "T" means a transposed matrix.

If such a received signal is received, the output Y of the MMSE filtering unit 46 is represented as the formula (9). The output Y is represented as an Nc-row by a 1-column vector.

[Number 9]

$$Y = WR \quad (9)$$

The MMSE filtering unit 46 determines an MMSE filtering coefficient based on the channel impulse response estimation value and the noise power estimation value. The MMSE filtering coefficient is represented as the formula (10) described below. The MMSE filtering coefficient W is an Nc-row by Nc column diagonal matrix.

[Number 10]

$$W = \begin{pmatrix} W_1 & & & 0 \\ & W_2 & & \\ & & \ddots & \\ 0 & & & W_{Nc} \end{pmatrix} \quad (10)$$

During the diffusion along a frequency axis, each elements of the MMSE filtering coefficient are represented by the formula (11) below.

[Number 11]

$$W_m = \frac{\hat{H}_m^H}{\hat{H}_m^H \hat{H}_m + (C_{max} - 1)\hat{H}_m^H \hat{H}_m + \hat{\sigma}_N^2} = \frac{\hat{H}_m^H}{C_{max}\hat{H}_m^H \hat{H}_m + \hat{\sigma}_N^2} \quad (11)$$

in addition,

[Number 12]

$$(C_{max} - 1)\hat{H}_m^H \hat{H}_m$$

is an interference elements from other code during the code multiplexing.

[Number 13]

$$\hat{\sigma}_N^2$$

indicates an estimation value of a noise power. In addition, the suffix "H" means a Hermitian conjugate.

If the orthogonality between codes is maintained during the diffusion along a time, each element of the MMSE filtering coefficient is represented by the formula (12) below.

[Number 14]

$$W_m = \frac{\hat{H}_m^H}{\hat{H}_m^H \hat{H}_m + \hat{\sigma}_N^2} \quad (12)$$

In addition, FIGS. 14(*a*) to 14(*c*) indicate that the signal passed the pass shown in FIG. 10 in the first process is supplied to the MMSE filtering unit 46 using the coefficient.

In addition, FIG. 14(*a*) indicates the channel impulse responses p1 to p6 shown in FIG. 10. FIG. 14(*b*) indicates the transfer function that the channel impulse responses p1 to p6 are represented in the frequency axis. In FIG. 14(*b*), the horizontal axis is frequency, and the longitudinal axis is power. In the first process, the frequency selectivity is high (the power change along the frequency axis is large). In such a state, in the MC-CDMA, the orthogonality [between the codes is not maintained, and an inter code interference occurs.

Next, the process of the MMSE filtering unit during the repeated process is described. The replica signal $\hat{r}_i$ used by the i-th soft canceller block unit 45-$i$ during the repeated demodulation is represented by the formula (13) below.

[Number 15]

$$\hat{r}_i = (\hat{h} - \hat{h}_i) \otimes \hat{s} \quad (13)$$

$\hat{h}_i$ is a delay profile which is only abstracted an arrival wave performed by the i-th soft canceller block unit 45-$i$. $\hat{s}(t)$ is a replica signal calculated based on the log likelihood ratio $\lambda 2$ obtained by the previous MAP decoding.

[Number 16]

$$\otimes$$

is a convolution calculation. Therefore, the output of the soft canceller block unit 45-$i$, in other words the output $\tilde{R}_i$ of the i-th soft canceller block unit 45 shown in FIG. 5 is represented by the formula (14) below.

[Number 17]

$$\tilde{R}_i = R - \hat{R}_i = [\hat{H}_1 \hat{H}_2 \ldots \hat{H}_B][\hat{S}^T \hat{S}^T \ldots \hat{S}^T]^T + \Delta = \hat{H}' \hat{S}' + \Delta = [\tilde{R}_1^T \tilde{R}_2^T \ldots \tilde{R}_B^T]^T \quad (14)$$

$\Delta$ includes the error signal according to an uncertainty and a thermal noise element of a replica. The output Y' of the MMSE filtering unit 46 is represented by the formula (15) below.

[Number 18]

$$Y' = W' \tilde{R}' = [W_1' W_2' \ldots W_B']\cdot[\tilde{R}_1^T \tilde{R}_2^T \ldots \tilde{R}_B^T]^T \quad (15)$$

If the replica signal's accuracy is good, and $\Delta$ does not include the element of the replica error and only includes the thermal noise element, a sub-matrix is as represented by as the formula (16) below.

$$W_i' \begin{bmatrix} W_{i,1}' & & & 0 \\ & W_{i,2}' & & \\ & & \ddots & \\ 0 & & & W_{i,Nc}' \end{bmatrix} \ldots \quad (16)$$

Further, the input signal of the MMSE filtering unit 46 includes less frequency selectivity as described below, and nearly becomes a flat fading. Therefore, if the inter code interference does not exist during the code multiplexing, each element is represented by the formula (17) below.

$$W_{i,m}' = \frac{\hat{H}_{i,m}^H}{\sum_{i'=1}^{B} \hat{H}_{i',m}^H \hat{H}_{i',m} + \hat{\sigma}_N^2} \ldots \quad (17)$$

In addition, $\hat{H}_{i',m}$ is m-th channel's transfer function in an i'-th soft canceller block. $\hat{H}_{i',m}^H$ is a Hermitian of the $\hat{H}_{i',m}$.

Figure 15:
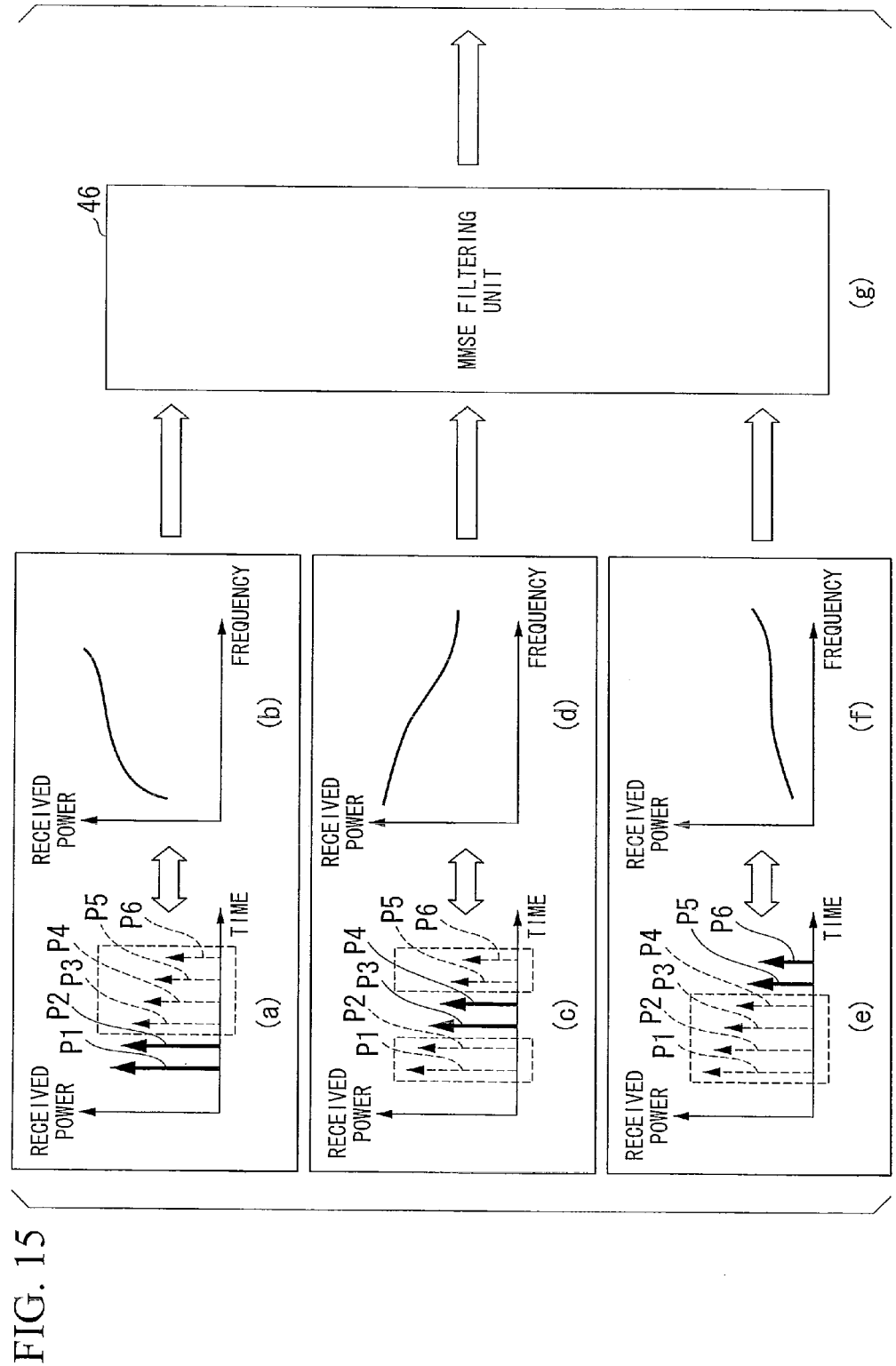
FIG. 15 is a diagram showing a channel impulse response estimation value in a repeated process and the MMSE filtering unit according to the first embodiment of the present invention.

FIG. 15($a$) to FIG. 15($g$) are diagrams showing a channel impulse response estimation value in a repeated process and the MMSE filtering unit according to the first embodiment of the present invention. In FIG. 15, in a repeated process, the signals which passed through the channel shown in FIG. 11 to FIG. 13 were inputted to the MMSE filtering unit 46 using the MMSE filtering coefficient. In addition, the number of the soft canceller block units is three.

The MMSE filtering unit 46 uses the MMSE filtering coefficient Wm which is shown in the formula (11) or in the formula (12) in the first demodulation process. The MMSE filtering unit 46 uses the MMSE filtering coefficient W'i,m which is shown in the formula (17) in the repeated demodulation process.

Similar to FIG. 14($a$), FIG. 15($a$), FIG. 15($c$) and FIG. 15($e$) indicate channel impulse responses p1 to p6 shown in FIG. 11 to FIG. 13. FIG. 15($b$), FIG. 15($d$) and FIG. 15($f$) indicate transfer functions that the channel impulse responses p1 to p6 are expressed along the frequency axis. In addition, the horizontal axis is the frequency, and the longitudinal axis is the power. In the repeated process, the frequency selectivity is low (the power change along the frequency axis is low). The state like this, in the MC-CDMA, the orthogonality is maintained between the codes, and inter code interference is hard to occur.

Like this, by performing the repeated process, the arrival wave which is longer than the guard interval (GI) is removed, and it is possible to remove the affection of the inter code interference.

According to the wireless reception device of the first embodiment of the present invention, the arrival wave replica generating unit 741 removes an arrival wave for every predetermined time period from the received signal r(t). The MMSE filtering unit 46 combines the signals which are removed the arrival waves every predetermined time periods. The soft decision outputting unit 50 performs the soft decision to the combined signals. Therefore, it is possible to perform the FFT for the signals which were removed the arrival waves. In addition, by removing the arrival waves, it is possible to perform the inverse diffusion process to the signals which are reduced the frequency selectivity, and it is possible to perform the removal of the inter code interference with calculation amount which does not relate to the code number.

In the first embodiment, as one example of the present invention, the cancelling, the replica generation, the demodulating process, and the decoding process are performed from the received signal using the soft decision result. In other words, the QPSK or the 16 QAM is performed as demodulating unit which demodulates the modulation signal (decompose the bit) from the received signal, and the MAP detecting unit which includes the soft decision outputting unit which outputs the log likelihood ratio is used. However, a detecting unit which outputs a hard decision valued may be used. In addition, a replica signal generating unit which generates the replica signal of the transmitted signal based on the hard decision value may be used. Further, the soft canceller block unit which removes the arrival wave based on the replica signal generated by the soft decision value is used. However, a cancelling unit which removes the arrival wave based on the replica signal generated by the hard decision value from the received signal may be used. Other embodiments described below similar to this.

In the first embodiment, when the outputs of each soft canceller block unit are combined, the MMSE synchronizing unit which is one example of the linear synthesis is used. However, the ZF (Zero Forcing) or the Maximum Ratio Combining) may be used. In addition, non-linear synthesis may be used.

Second Embodiment

Next, a second embodiment of the present invention is described. In the second embodiment, the setting method of abstracting predetermined time periods of the predetermined wave interval by removing the arrival wave replica from the received signal based on the power of arrival wave (include direct wave) is described. A MAP detecting unit of a wireless reception device of the second embodiment is different from the first embodiment. The configuration of the MAP detecting unit is described and other explanations are omitted.

Figure 16:
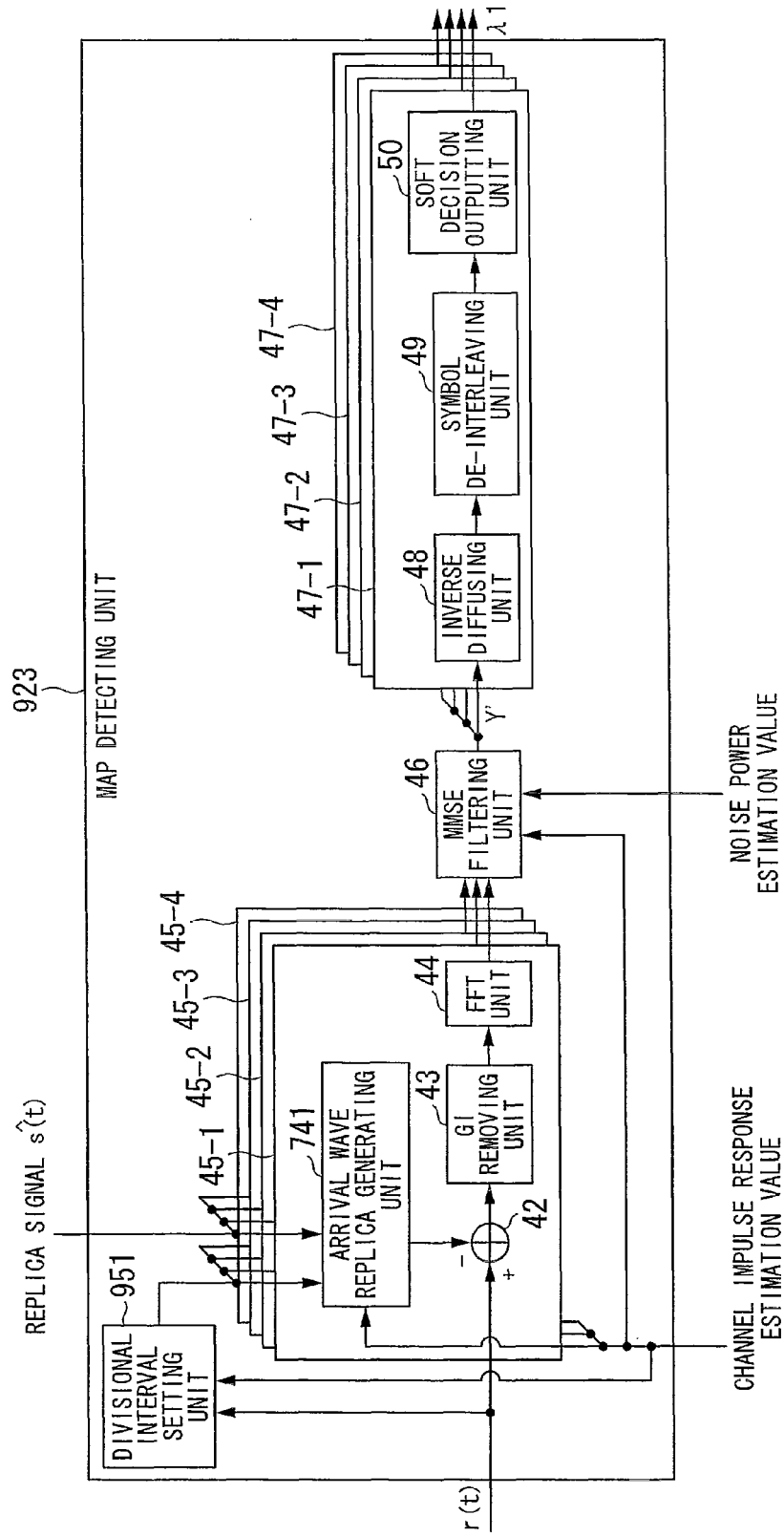
FIG. 16 is a diagram showing an example of a configuration of a MAP detecting unit 923 (FIG. 3) according to a second embodiment of the present invention.

FIG. 16 is a diagram showing an example of a configuration of a MAP detecting unit 923 (FIG. 3) according to a second embodiment of the present invention. The MAP detecting unit 923 includes soft canceller block units 45-1 to 45-4, a MMSE filtering unit 46, every code log likelihood ratio outputting units 47-1 to 47-4 and a divisional interval setting unit 951 (also called the time period setting unit). Each soft canceller block unit 45-1 to 45-4 includes an arrival wave replica generating unit 741, an adding unit 42, a GI removing unit 43, and an FFT unit 44.

The configuration of the wireless reception device according to the second embodiment is almost the same as the wireless reception device (FIG. 3) and the MAP detecting unit (FIG. 3). However, the process of the divisional interval setting unit is different from the first embodiment.

The divisional interval setting unit 951 calculates a standard power based on a standard time information from the received signal and a channel impulse response estimation value, and sets the interval which is used for dividing the arrival wave with time width which is the power difference between the received signal power and the standard power abstracted by each soft canceller block units 45-1 to 45-3.

Figure 17:
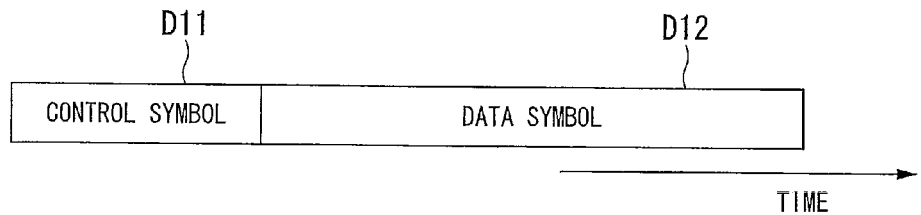
FIG. 17 is a diagram showing an example of a configuration of a received signal r(t) according to the second embodiment of the present invention.

The divisional number is decided based on the standard power and the channel impulse response estimation value. For example, as shown in FIG. 17, in the received signal r(t), the standard time information is obtained to the previous the data symbol D12, from the control symbol D11 which includes the standard time information. In addition, the standard time information may be set between the wireless transmission device and the wireless reception device in advance. The arrival wave replica generating unit 741 of the soft canceller block unit generates the replica based on the output of the divisional interval setting unit. The operations of other portions are the same as in FIG. 5. The explanation is omitted.

Figure 18:
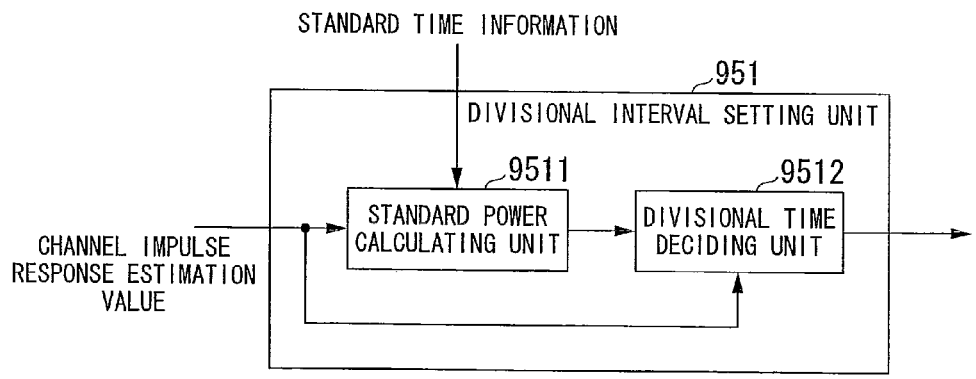
FIG. 18 is a diagram showing an example of a configuration of a divisional interval setting unit 951 (FIG. 16) according to the second embodiment of the present invention.

FIG. 18 is a diagram showing an example of a configuration of a divisional interval setting unit 951 (FIG. 16) according to the second embodiment of the present invention. The information which is set the guard interval length is set as the standard time information, and the reception device receives the information from the wireless transmission device. The divisional interval setting unit 951 includes a standard power calculating unit 9511 and a divisional time deciding unit 9512.

The standard power calculating unit 9511 is inputted the channel impulse response estimation value and the guard interval length which is the standard time information is input into the standard power calculating unit 9511, and a minimum power during the interval of the guard interval length is calculated.

Figure 19:
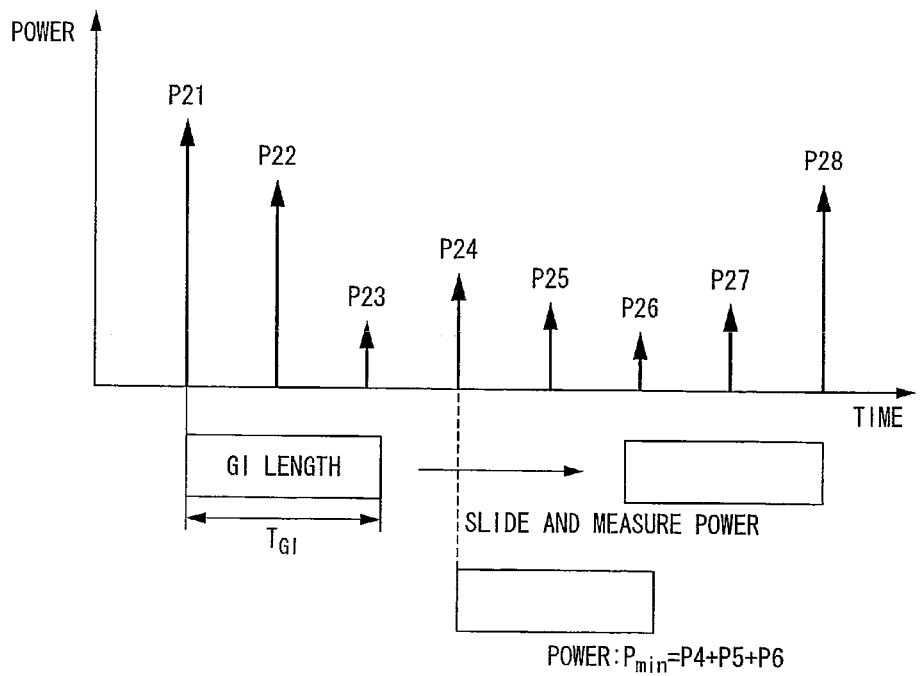
FIG. 19 is an explanatory diagram showing a channel impulse response estimation value which is inputted in a standard power calculating unit 9511 (FIG. 18) according to the second embodiment of the present invention.

FIG. 19 is an explanatory diagram showing a channel impulse response estimation value which is inputted in a standard power calculating unit 9511 (FIG. 18) according to the second embodiment of the present invention. For example, if it is estimated that the eight waves P21 to P28 shown in FIG. 19 arrive from the wireless transmission device at the wireless reception device as the channel impulse response estimation value, and the guard interval length TGI (also called predetermined time) is moved from P21 to P28, and pass power which is included in the guard interval length TGI at each slide point, and a minimum power Pmin among the measured power is outputted. In other words, the standard power calculating unit 9511 of the divisional interval setting unit 951 sets each time period based on the time period which is minimum of total received power of the received signal which is included in the guard interval length TGI. In FIG. 19, when the slide point accords to the P24, the power becomes minimum. The power Pmin is the sum of powers P24, P25 and P26.

In FIG. 18, the divisional time deciding unit 9512 calculates the time width of each block based on the channel impulse response estimation value and the power Pmin supplied by the standard power calculating unit 9511 when the channel impulse response estimation value is divided into the power Pmin, and the time width is supplied to the arrival wave replica generating unit 741. The divisional time setting unit 9512 may calculate the arrival time of pass which includes each block instead of the time width of each block.

Figure 20:
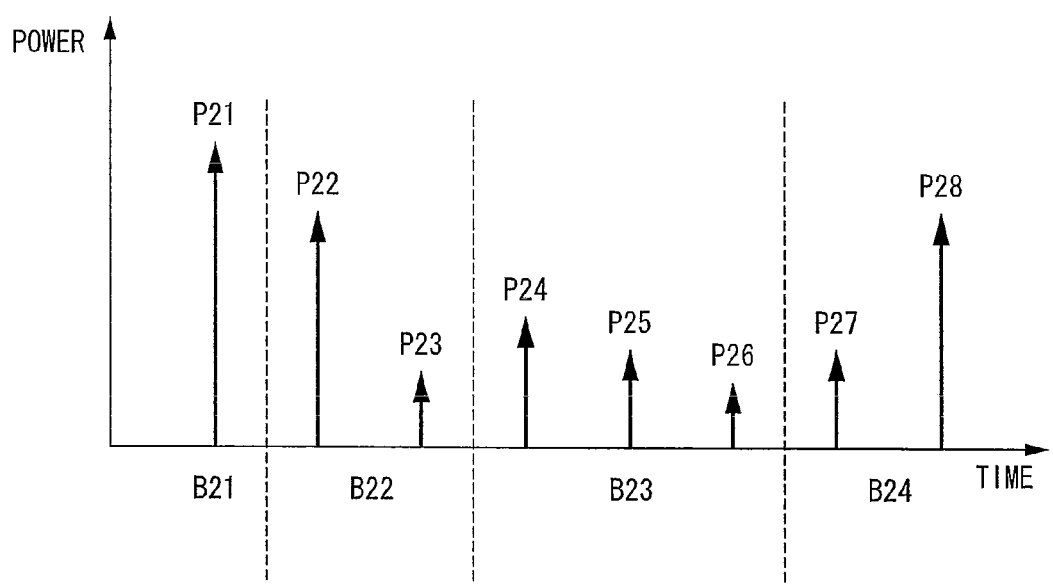
FIG. 20 is an explanatory diagram showing a setting method of divisional time of the divisional time setting unit 9512 according to the second embodiment.
Figure 21:
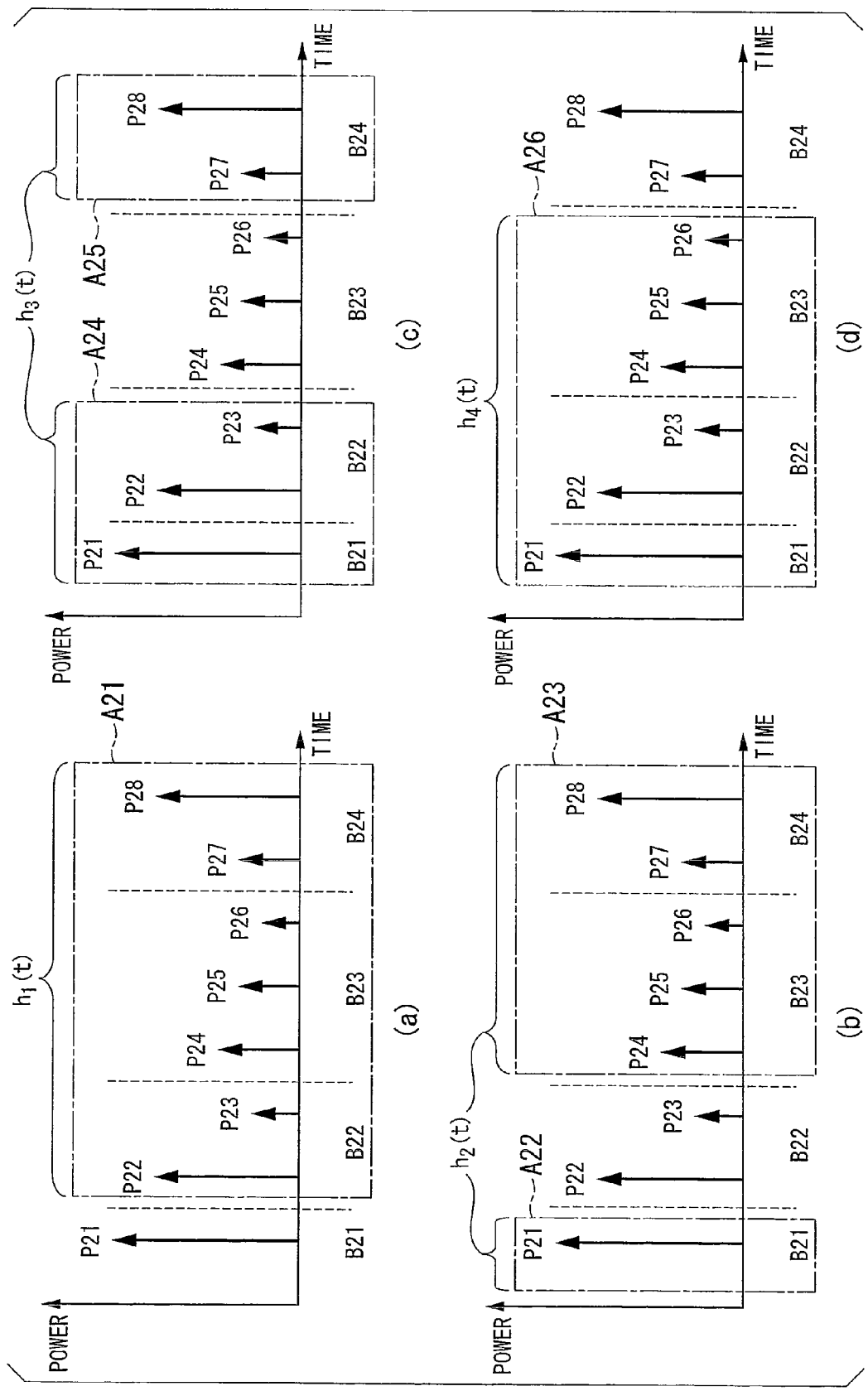
FIG. 21 is an explanatory diagram showing arrival waves which are removed according to the second embodiment of the present invention.

FIG. 20 is an explanatory diagram showing a setting method of divisional time of the divisional time setting unit 9512 according to the second embodiment. In FIG. 19, the divisional time setting unit 9512 divides such that the block become the power Pmin. The channel impulse response estimation value is divided into B21 to B24, such that arrival wave's power of each blocks become Pmin. The block B21 includes the pass P21. The block B22 includes the passes P22 and P23. The block B23 includes the passes P24, P25 and P26. The block B24 includes the passes P27 and P28.

The divisional time deciding unit 9512 supplies the arrival wave's arrival time which is included in each blocks B21 to B24 to the soft canceller block units 45-1 to 45-4.

In FIG. 20, the channel impulse response estimation value is sequentially divided, from the signal estimated as first arrival wave, such that the power become Pmin. However, the channel impulse response estimation value may be divided from the signal estimated as last arrival wave. In addition the channel impulse response estimation value may be divided based on the minimum slide point.

In addition, the division block number of the soft canceller block units 45-1 to 45-4 may be provided, and perform a process in parallel. In addition, only one of the soft canceller block unit of the MAP detecting unit 923 may be provided, and a process in serial may be performed.

The arrival wave replica generating unit 741 (FIG. 16) of the soft canceller block units 45-1 to 45-4 generates the arrival wave replica by performing the convolution calculation of the impulse response of each block interval and the received signal R(t). The delay replica generated by the arrival wave replica generating unit 741 is removed from the received signal by the adding unit 42.

FIG. 21(a) to FIG. 21(d) are explanatory diagrams showing arrival waves which are removed according to the second embodiment of the present invention.

The area A21 enveloped with chain line in FIG. 21(a) indicates the arrival wave which is removed by the soft canceller block unit 45-1. The arrival wave replica generating unit 741 subtracts, from the received signal R(t), the replica which is generated by performing the convolution calculation of the impulse response $h1(t)$ and the replica signal $\hat{S}(t)$ in the blocks B22 to B24. Therefore, the predetermined signal element of the block 21 is abstracted.

The areas A22 and A23 enveloped with chain line in FIG. 21(b) indicates the arrival wave which is removed by the soft canceller block unit 45-2. The arrival wave replica generating unit 741 subtracts, from the received signal R(t), the replica which is generated by performing the convolution calculation of the impulse response $h2(t)$ and the replica signal $\hat{S}(t)$ in the blocks B21, B23 and B24. Therefore, the predetermined signal element of the block 22 is abstracted.

The areas A24 and A25 enveloped with chain line in FIG. 21(c) indicates the arrival wave which is removed by the soft canceller block unit 45-3. The arrival wave replica generating unit 741 subtracts, from the received signal R(t), the replica which is generated by performing the convolution calculation of the impulse response $h3(t)$ and the replica signal $\hat{S}(t)$ in the blocks B21, B22 and B24. Therefore, the predetermined signal element of the block 23 is abstracted.

The areas A26 enveloped with chain line in FIG. 21(d) indicates the arrival wave which is removed by the soft canceller block unit 45-4. The arrival wave replica generating unit 741 subtracts, from the received signal R(t), the replica which is generated by performing the convolution calculation of the impulse response h4(t) and the replica signal S^(t) in the blocks B21, B22 and B23. Therefore, the predetermined signal element of the block 24 is abstracted.

In each soft canceller block units 45-1 to 45-4, the arrival replica generating unit generates the replica of the arrival wave which is included in the area enveloped with chain line. Then, the adding unit 42 subtracts the replica of the arrival wave generated by the arrival wave replica generating unit 741 from the received signal r(t).

As described above, the guard interval length is used. Then, the arrival wave is divided such that the arrival wave becomes minimum power value in the standard time of the channel impulse response estimation value of the received signal. By generating the arrival wave replica based on the block dividing, the signal which was removed the replica is shorter than the guard interval length, and the arrival wave replica's power generated by the each soft canceller block units 45-1 to 45-4 is low, and the dividing number become minimum in the condition. Therefore, the depletion of the characteristics based on the ISI and the ICI are improved. Then, the depletion of the characteristics of the replica error based on the increasing of the divisional number are improved. Then it is possible to lessen the considerably bad interval of removal remainder at the soft canceller block units 45-1 to 45-4. Therefore, it is possible to prevent the considerable depletion of the replica accuracy becomes whole characteristics depletion, and it is possible to minimize the characteristics depletion based on the replica error.

In the aforementioned explanation, in each block of the divided arrival wave, the standard power is fulfilled. The next example is that the arrival wave is divide sequentially, and last remained pass is fewer than the standard power.

Figure 22:
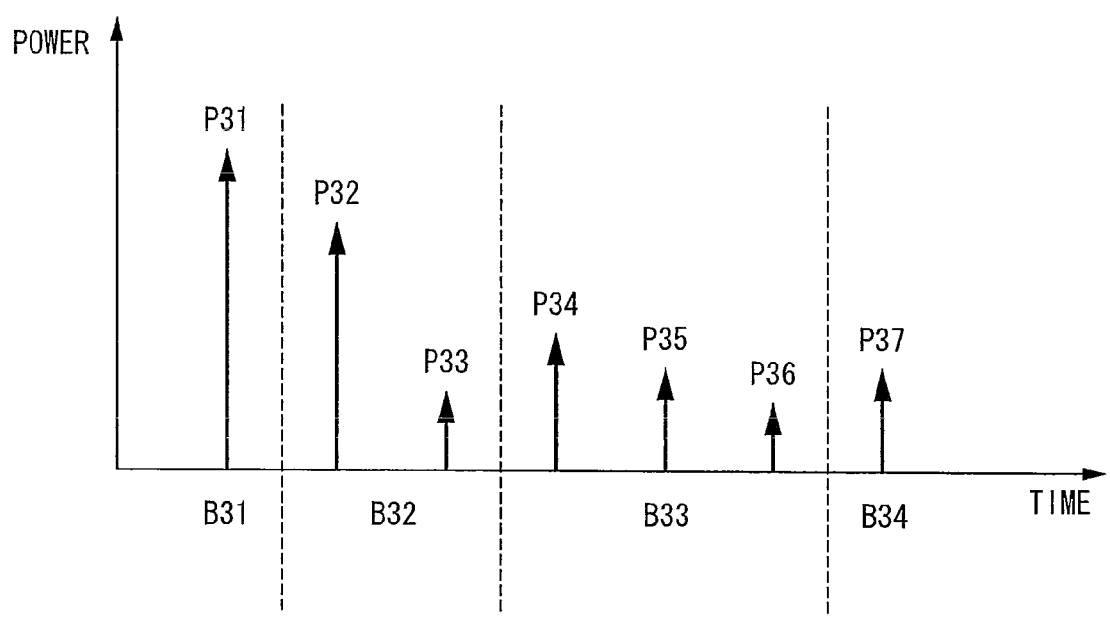
FIG. 22 is a diagram showing an example of block dividing according to the second embodiment of the present invention.

FIG. 22 shows that the arrival waves of P31 to P37 are estimated from the channel impulse response estimation value, and the arrival wave is divided into the blocks B31 to B34 based on the minimum power value Pmin in the guard interval length TGI from first arrival wave P31 sequentially. The blocks B31 to B33 fulfill the power value Pmin, but the block B34 does not fulfill. In this case, if the power of the block B34 is larger than the predetermined power value, similar to FIG. 21, the replica of the arrival wave is generated. If the power of the block B34 is equal or smaller than the predetermined power value, it is not used to generate the replica. In addition, the arrival wave replica is generated using three blocks B31 to B33. By determining the predetermined power value considering the generation error of the replica, it is possible to prevent to generate the replica which has considerably low power. Then, it is possible to prevent considerable depletion of the replica's accuracy during the predetermined interval becomes the whole characteristics depletion.

In the second embodiment, if the standard power value outputted by the standard power calculating unit 9511 is Pall/B of the first embodiment, and the arrival wave is divided such that the difference between the received signal power of the predetermined signal interval abstracted by each of the soft canceller block units 45-1 to 45-4 and the standard power, the MAP detecting unit 923 of the second embodiment is able to perform a process which is similar to the process of the MAP detecting unit 723 (FIG. 5) of the first embodiment.

Third Embodiment

Next, a third embodiment of the present invention is described. In the third embodiment, another setting method of the predetermined time period of the predetermined wave interval abstracted by removing the arrival wave replica from the received signal based on the power of the arrival wave (include direct wave) is described. The configuration of a MAP detecting unit of the wireless reception device according to the third embodiment is different from the first embodiment. Therefore, the difference is mainly described, and other explanations are omitted.

Figure 23:
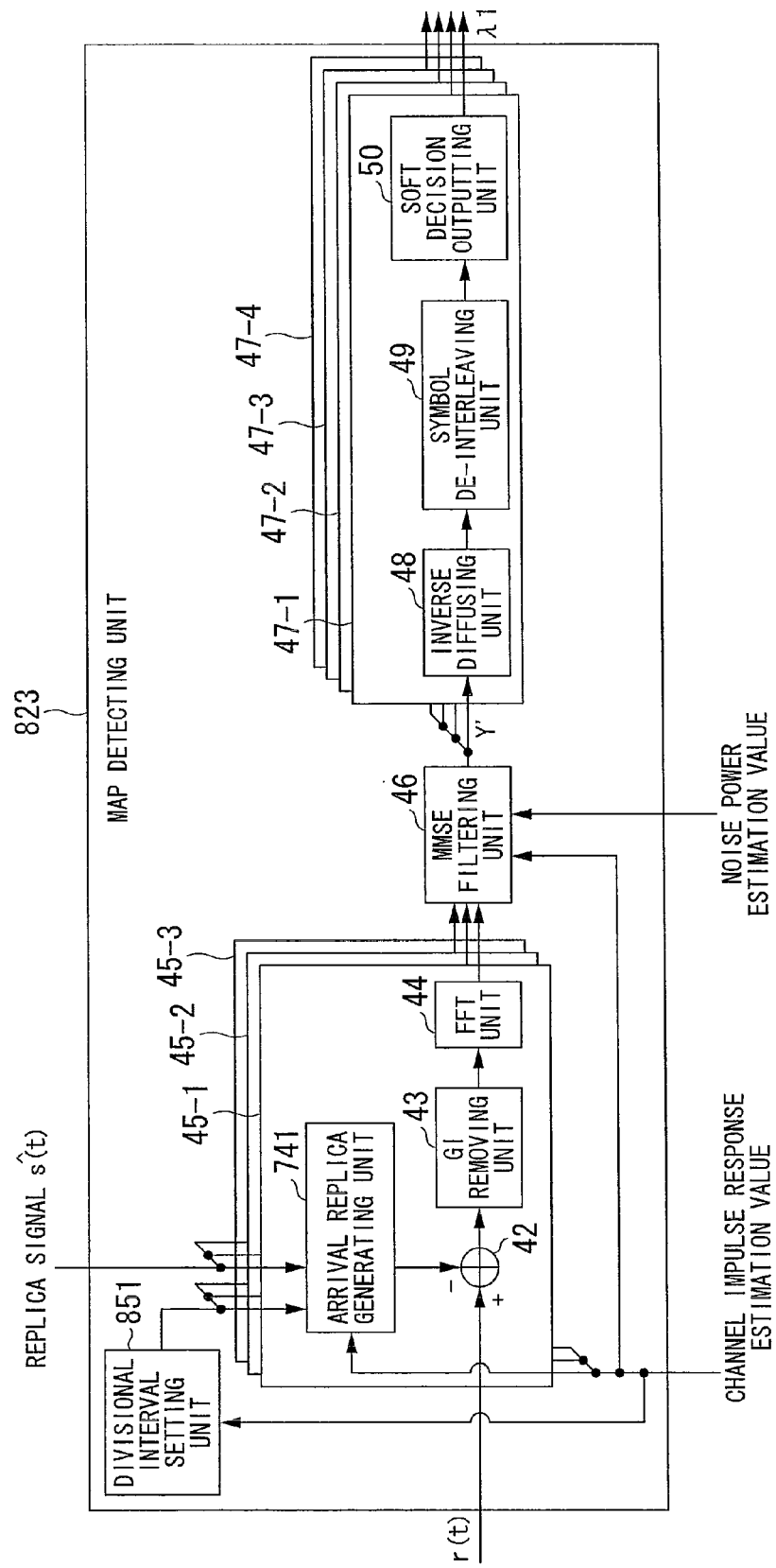
FIG. 23 is a diagram showing an example of a configuration of a MAP detecting unit 823 according to a third embodiment of the present invention.

FIG. 23 is a diagram showing an example of a configuration of a MAP detecting unit 823 according to a third embodiment of the present invention. The MAP detecting unit 823 includes soft canceller block units 45-1 to 45-3, an MMSE filtering unit 46, every code log likelihood ration outputting units 47-1 to 47-4 and a divisional interval setting unit 851 (also called the group setting unit). In addition, each soft canceller block units 45-1 to 45-3 includes a arrival wave replica generating unit 741, an adding unit 42, a GI removing unit 43 and an FFT unit 44.

The configuration of a wireless reception device according to the third embodiment is almost the same as the configuration of the wireless reception device (FIG. 3) and the MAP detecting unit (FIG. 5) according to the first embodiment. However, the process of the divisional interval setting unit is different from the first embodiment.

The divisional interval setting unit 851 performs a grouping of the received signal based on the received power of the received signal. Specifically, the channel impulse response estimation value which is the channel estimation value of the received signal is divided based on a short interval (also called a pass divisional interval) which is shorter than the predetermined signal interval abstracted by the soft canceller block units 45-1 to 45-3. Then, each pass divisional intervals performs the grouping such that the received signal powers between the predetermined signal intervals abstracted the soft canceller block units 45-1 to 45-3 are equal.

The arrival wave replica generating unit 741 generates the replica based on the grouping result of the pass divisional interval. For example, the every arrived arrival wave or the every sample timing of the AD converter is used as the pass divisional interval. Other portions are similar to FIG. 5. Therefore, the operations thereof are omitted.

Figure 24:
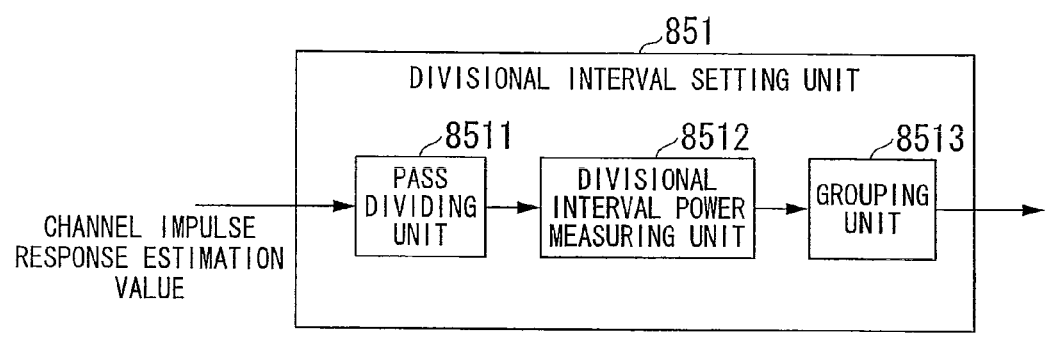
FIG. 24 is a schematic block diagram showing a configuration of a divisional interval setting unit 851 according to the third embodiment of the present invention.

FIG. 24 is a schematic block diagram showing a configuration of a divisional interval setting unit 851 according to the third embodiment of the present invention. The divisional interval setting unit 851 includes a pass dividing unit 8511, a divisional interval power measuring unit 8512 and a grouping unit 8513.

The pass dividing unit 8511 performs an M (M is an integer number which is equal to 2 or greater than 2) points sampling to the inputted channel impulse response estimation value using the predetermined timing. If the arrival wave replica pattern number which is generated by the soft canceller block units 45-1 to 45-3 is N (N is an integer number which is equal to or greater than 2), the sample point M is indicated as $N \leq M$.

Figure 25:
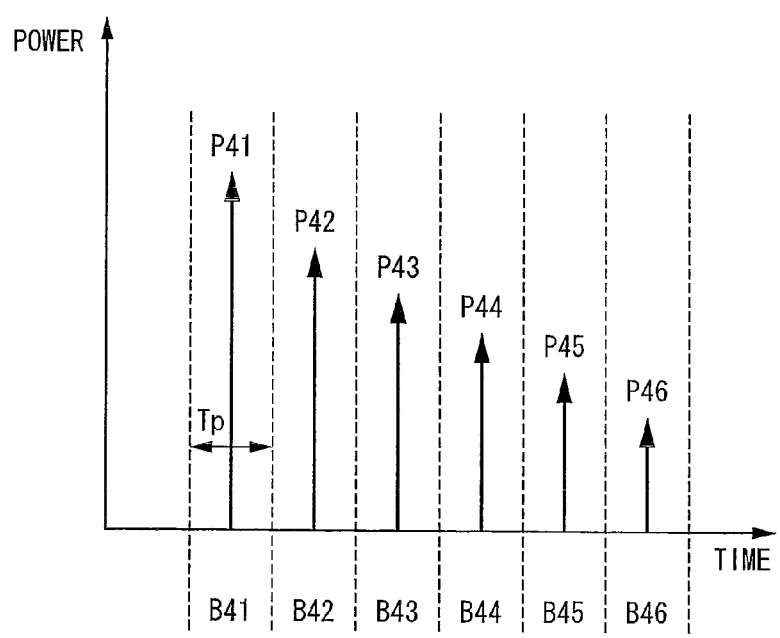
FIG. 25 is a diagram showing an example of ranking returning according to the third embodiment of the present invention.

For example, in FIG. 25, if it is estimated that the six waves P41 to P46 have arrived, the every arrived arrival wave pass is the sample point (M=6). The divisional interval power measuring unit 8512 searches the arrival wave pass from the channel impulse response estimation value, and measures the predetermined power of an interval Tp (pass interval) based on the sampling points for every arrival wave pass.

In FIG. 25, if the predetermined interval Tp=0, the power of every sample point (every passes) are measured, and the powers of the pass divisional intervals B41 to B46 are P41, P42, P43, P44, P45 and P46. In the grouping unit 8513, the power of each pass divisional intervals are performed a ranking process (sequencing) by sorting in descending. Then, generated arrival wave replicas are assigned to the soft canceller block units 45-1 to 45-3 by ranking loop back. For example, the grouping unit 8513 of the divisional interval setting unit 851 sequences the received signal based on the size of the received power, and the received signal whose power is large and the received signal whose power is small are set to the same group.

Figure 26:
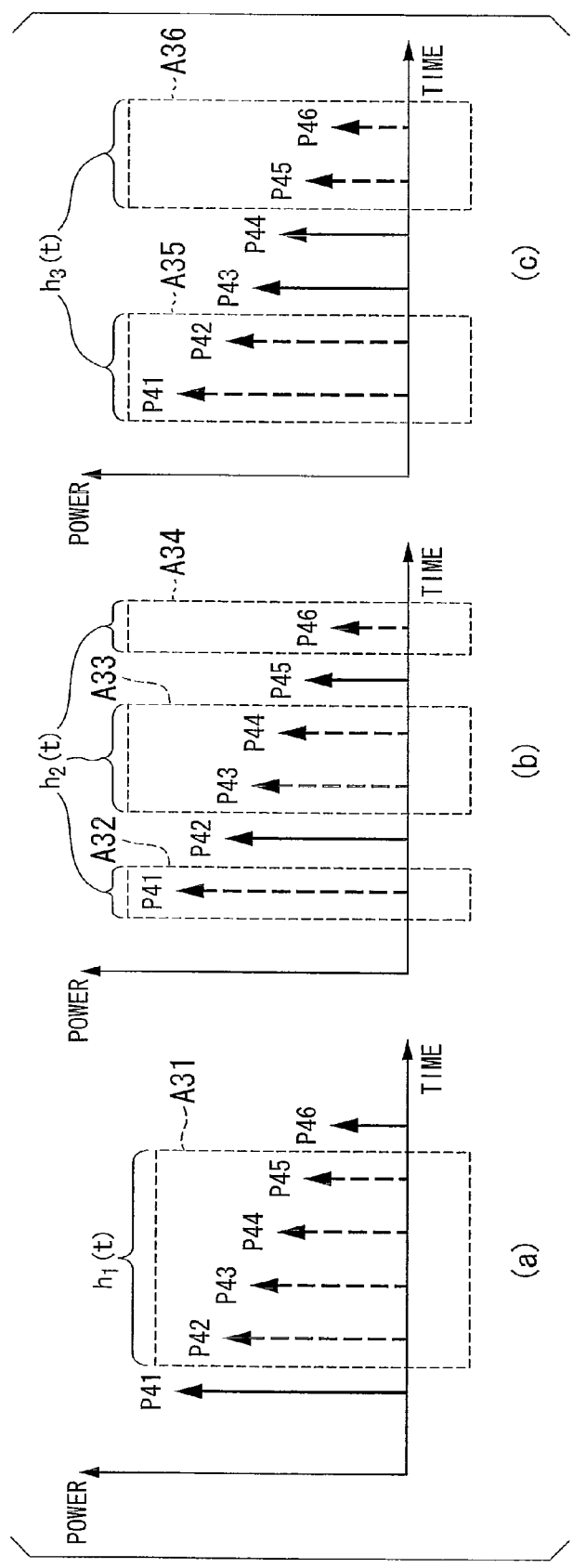
FIG. 26 is a diagram showing arrival replicas which are generated by the soft canceller block units 45-1 to 45-3 and are removed from the received signal according to the third embodiment of the present invention.

For example, in FIG. 25, if the sizes of the power values measured by the divisional interval power measuring unit 8512 fulfill the condition that P46<P45<P44<P43<P42<P41, and if the replicas generate the soft canceller block units 45-1 to 45-3 (in other words N=3), a pass divisional interval loop back assignment is performed such that P41 and P46, P42 and P45, P43 and P44 are each set to the same groups (FIG. 26).

In the arrival wave replica generating unit 741 of each soft canceller block units 45-1 to 45-3, a replica is generated according to the arrival wave's assignment of the grouping unit 8513.

FIGS. 26(a) to 26(c) are diagrams showing arrival replicas which are generated by the soft canceller block units 45-1 to 45-3 and are removed from the received signal according to the third embodiment of the present invention. As shown in FIG. 26(a), the replica of the arrival wave which is included in the area A31 which is enveloped by the dotted line is generated, and is removed from the received signal. In addition, as shown in FIG. 26(b), the replica of the arrival waves which is included in the areas A32, A33 and A34 which are enveloped by the dotted lines are generated, and are removed from the received signal. In addition, as shown in FIG. 26(c), the replica of the arrival waves which is included in the areas A35 and A36 which are enveloped by the dotted lines are generated, and removed from the received signal.

In FIGS. 26(a) to 26(c), the arrival wave replica patterns become three patterns (N=3) shown in FIG. 26(a), FIG. 26(b) and FIG. 26(c).

The arrival wave replica generating unit 741 of the soft canceller block unit 45-1 (FIG. 5) performs the convolution calculation of the impulse response h(t) for the passes P42 to P45 and the replica signal S^(t), and outputs it to the adding unit 42. The adding unit 42 subtracts the convolution calculation result of the impulse response h1(t) and the replica signal S^(t) from the received signal r(t).

Similarly, the arrival wave replica generating unit 741 of the soft canceller block unit 45-2 (FIG. 5) performs a convolution calculation of the impulse response h2(t) for the passes P41, P43, P44 and P46 and the replica signal S^(t), and outputs the value to the adding unit 42. The adding unit 42 subtracts the convolution calculation result of the impulse response h2(t) and the replica signal S^(t) from the received signal r(t).

Similarly, the arrival wave replica generating unit 741 of the soft canceller block unit 45-3 (FIG. 5) performs a convolution calculation of the impulse response h3(t) for the passes P41, P42, P45 and P46 and the replica signal S^(t), and outputs the value to the adding unit 42. The adding unit 42 subtracts the convolution calculation result of the impulse response h3(t) and the replica signal S^(t) from the received signal r(t).

As described above, the channel impulse response estimation value is performed the sampling using interval which is shorter than the predetermined interval which is abstracted by the soft canceller block units 45-1 to 45-3. Then, the arrival wave's power in the predetermined time which includes every sampling point is measured. The grouping is performed in descending by the ranking loop back. Therefore, it is possible to lessen the difference between the power values which are assigned to each group.

Then, in the soft canceller block units 45-1 to 45-3, the arrival wave replica is generated according to the group. It is possible to prevent considerable depletion of the replica accuracy becomes the whole characteristics depletion, and it is possible to minimize the characteristics depletion by the replica error. In the aforementioned explanation, the channel impulse response estimation value is divided every arrival wave's passes, and the ranking loop back based on the power is performed. However, the channel impulse response estimation value may be divided every AD converter's sampling points, and the ranking loop back based on the power may be performed.

Figure 27:
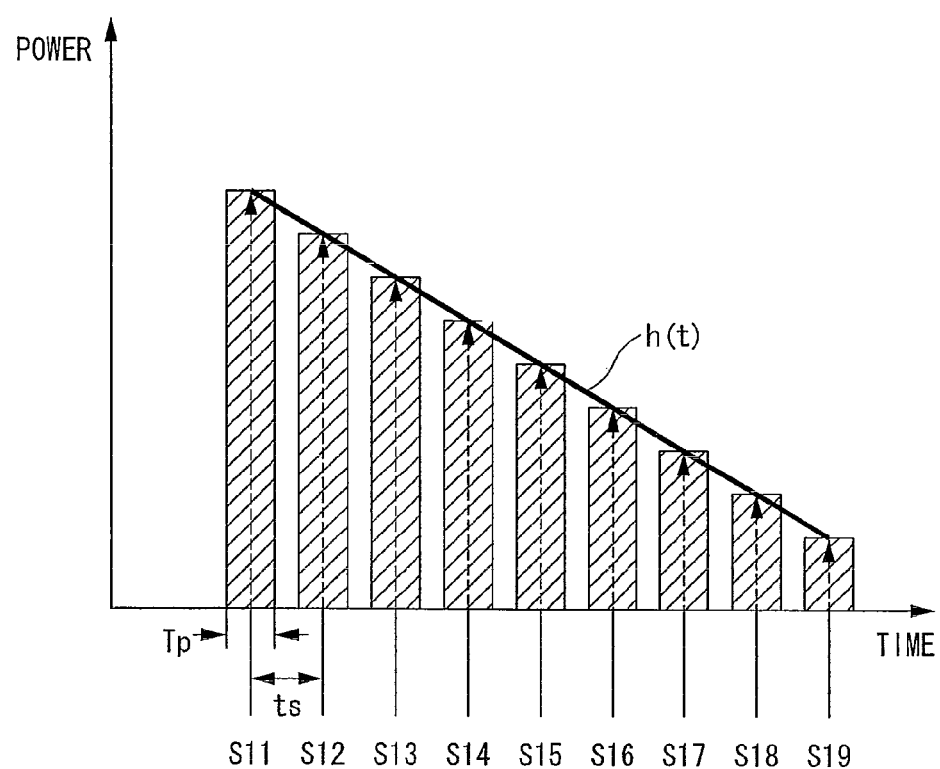
FIG. 27 is an explanatory diagram when the channel impulse response estimation value is divided every sample points of an AD converter.
Figure 28:
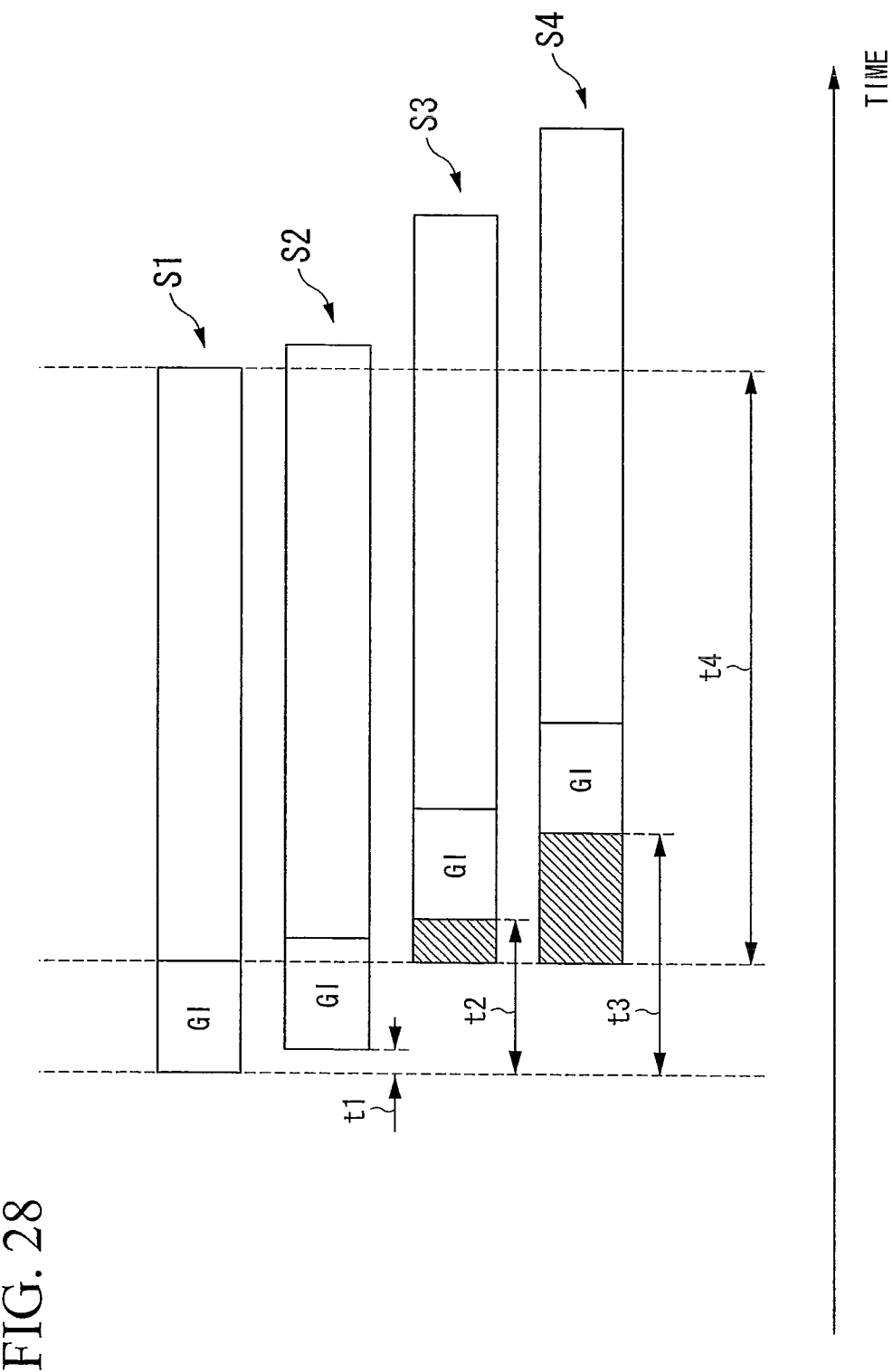
FIG. 28 is a diagram showing signals which are transmitted from a wireless transmission device to a wireless reception device via a multi-pass environment.
Figure 29:
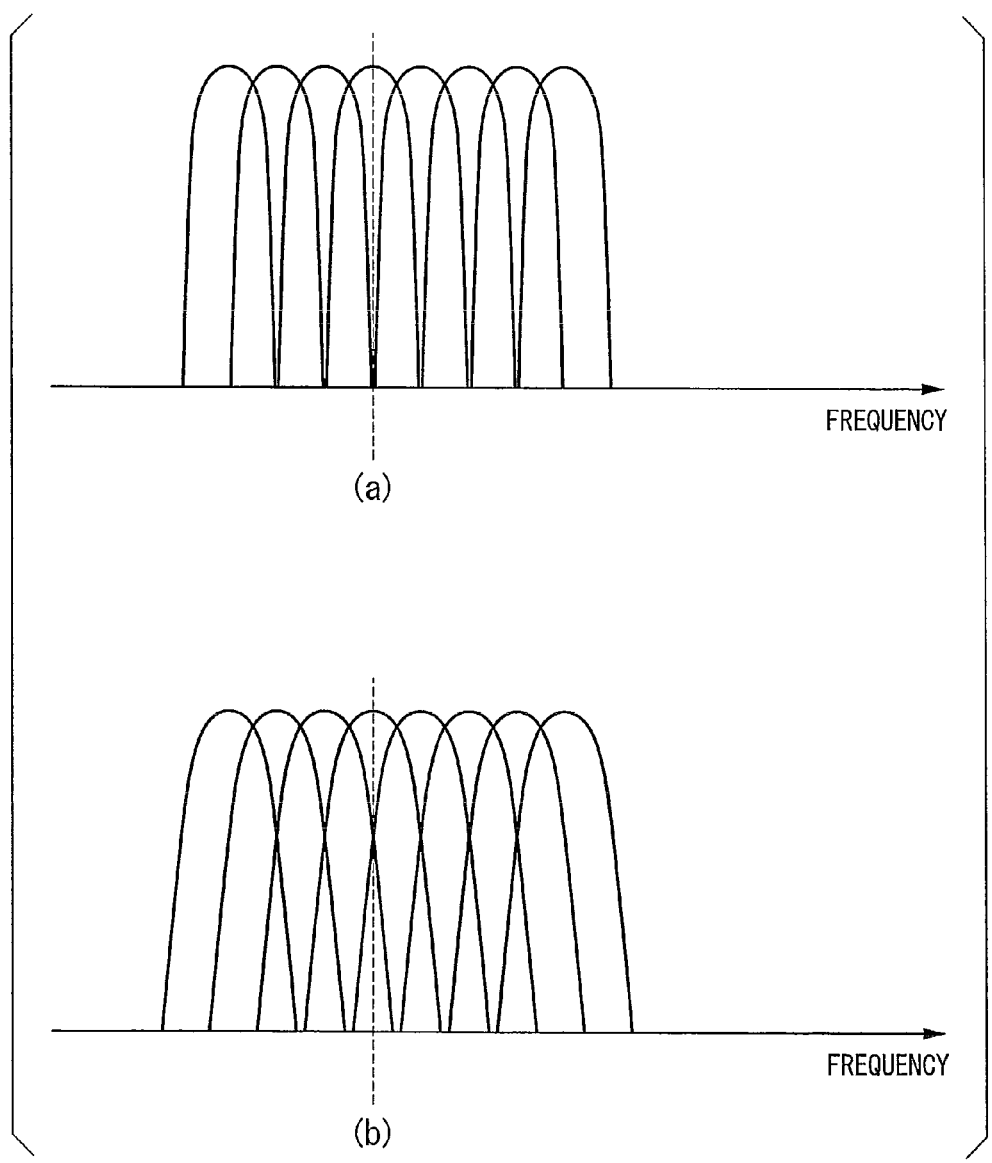
FIG. 29 is a diagram showing a state that sub-carriers are orthogonal and a state that an interference occurs between the sub-carriers by the ICI, in transmission and reception of signals in a multi-carrier system.
Figure 30:
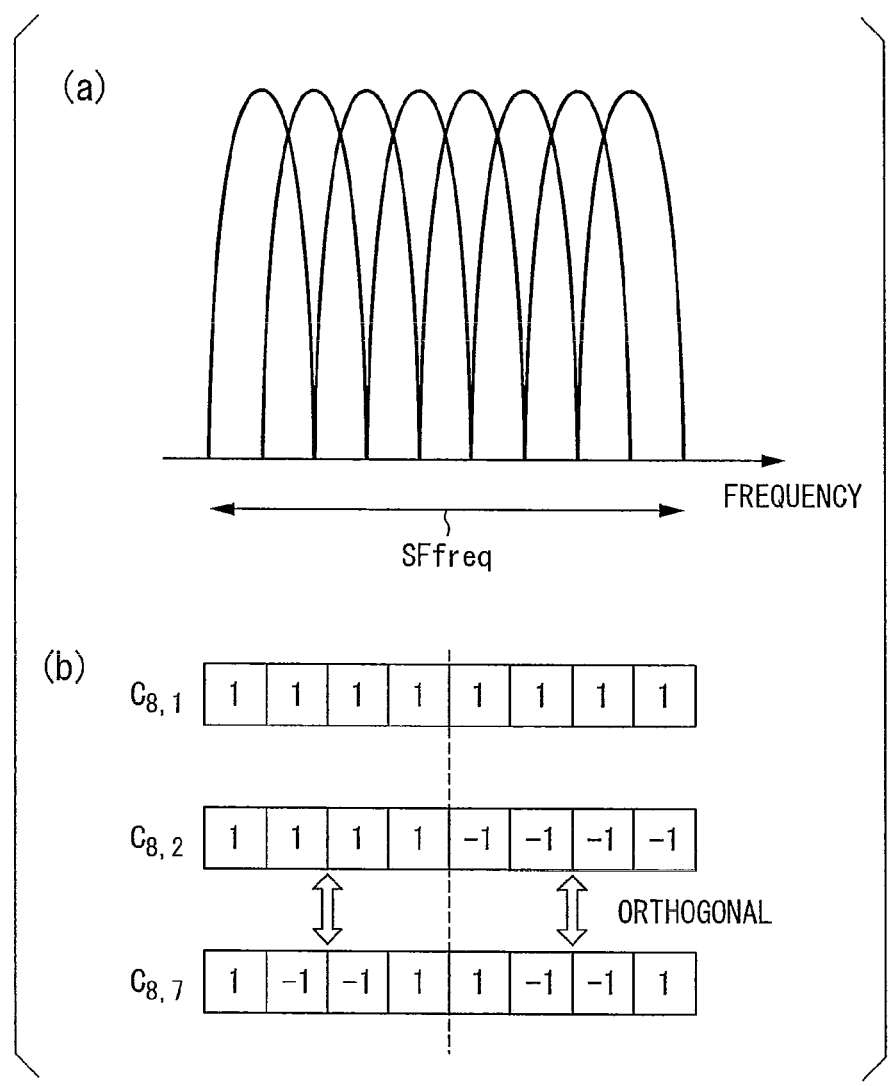
FIG. 30 is a diagram showing a relationship between sub-carriers and orthogonal codes corresponding to each sub-carrier in the MC-CDMA.
Figure 31:
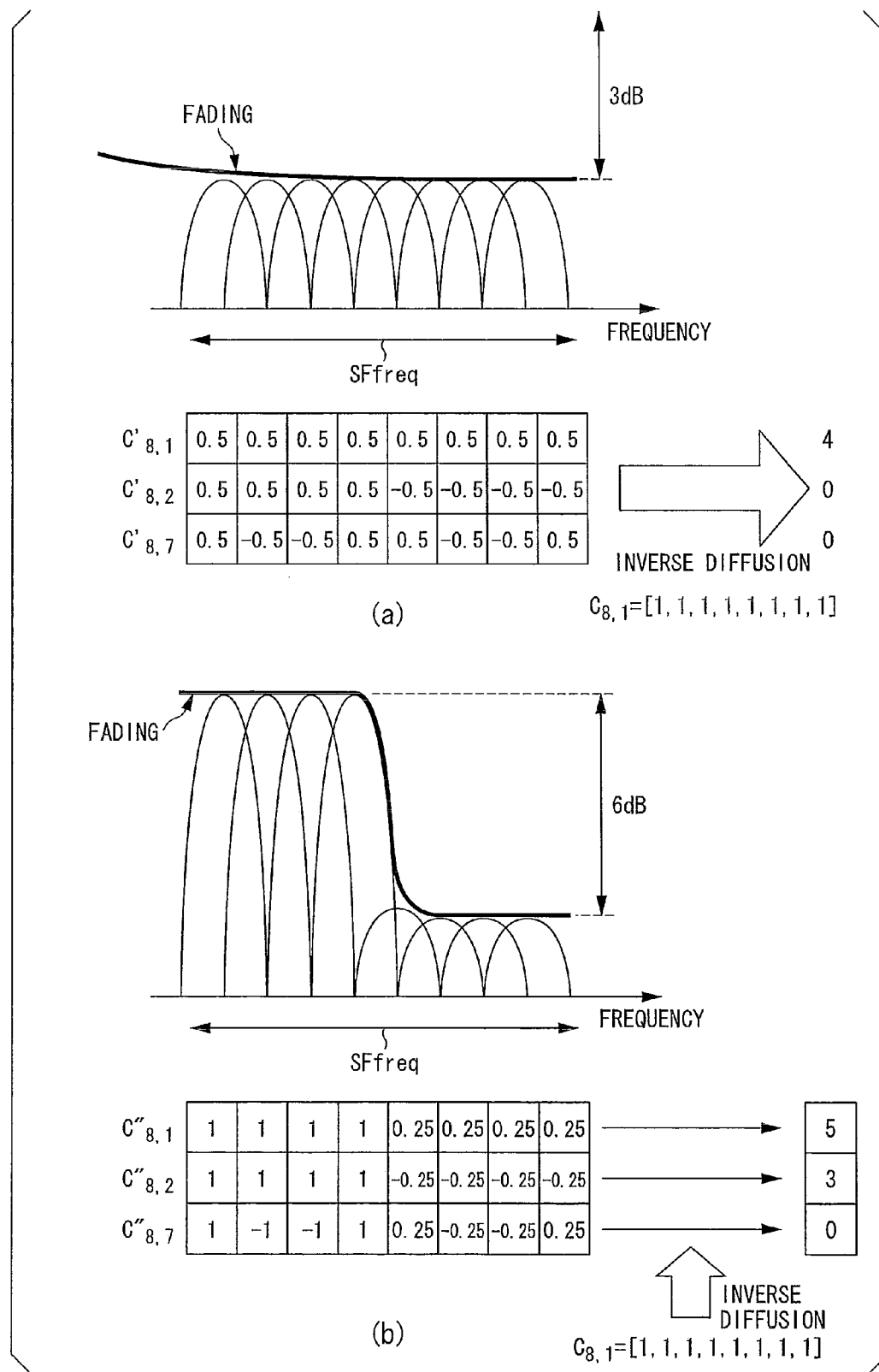
FIG. 31 is a diagram showing signals in the MC-CDMA system being transmitted in the air, and codes $C'_{8,1}$, $C'_{8,2}$, $C''_{8,7}$, $C''_{8,1}$, $C''_{8,2}$ and $C''_{8,7}$ being received.

FIG. 27 is an explanatory diagram when the channel impulse response estimation value is divided every sample points of an AD converter. In FIG. 27, the channel impulse response estimation value h(t) is performed the sampling with interval is according to the sample rate of the AD converter. s11 to s19 each indicate sampling points. In each sampling points, the power of each block is calculated (diagonal region in FIG. 27) based on the impulse response h(t) in the block of the interval Tp which includes the sampling points. By performing the ranking according to the powers of each block which include s11 to s19, and by performing the ranking loop back using the arrival wave pattern number generated by the soft canceller block units 45-1 to 45-3, the generated arrival replicas are assigned.

In aforementioned explanation, the divided pass intervals are performed the ranking in descending of the power, and the group assignment is performed to the predetermined interval abstracted by the soft canceller block units 45-1 to 45-3. However, the grouping may be performed as the power difference between the groups is less than the predetermined value such that the difference does not affect the replica accuracy of each block. For example, if the predetermined power $P_{ideal}$ of the received signal of each group is set, the powers P41, P42, P43, P44, P45 and P46 of each divided time period may be combined to be the predetermined power $P_{ideal}$. Therefore, it is possible to control so that the difference between the groups is smaller than the predetermined value which does not affect the replica accuracy of each block. For example, the predetermined power $P_{ideal}$ is set based on the SINR of the received signal, the modulation multiplexing value of the received signal or the code multiplexing number of the received signal.

In the aforementioned explanation, the replica generated by the arrival wave replica generating unit 741 is determined only by the ranking loop back based on the power. When divided passes are assigned to the groups, pass's time width which are included in the same group may be shorter than the guard interval.

In addition, in the present embodiment, the division number of arrival waves is determined in advance. However, for example, the division number of arrival waves may be determined such that the time width divided block is shorter than the guard interval length.

In addition, in the first to third embodiments, it is also possible to control the wireless transmission device and the wireless reception device by recording on a computer-readable recording medium a program which realizes the functions or a portion of the functions of each section of the wireless transmission device and each section of the wireless reception device, and by causing this program recorded on a recording medium to be read and executed by a computer system. Note that, here, 'computer system' includes the OS and hardware such as peripheral devices and the like.

Moreover, 'computer readable recording medium' refers to a storage medium such as a portable medium such as a flexible disc, a magneto-optical disc, ROM, a CD-ROM, or a hard disc incorporated in a computer system or the like. Furthermore, 'computer readable recording medium' also includes devices that hold a program dynamically for short periods of time such as communication lines when the program is transmitted via a network such as the Internet or via a communication circuit such as a telephone line, and includes devices which hold a program for a fixed period of time such as the volatile memory incorporated in computer systems which form the servers and clients in the case of the communication lines or networks described above. The above-described program may realize a portion of the above described functions or may realize the above-described functions in combination with a program which has already been recorded on a computer system.

Embodiments of this invention have been described in detail above with reference made to the drawings, however, the specific structure of this invention is not limited to these embodiments and other designs and the like are also included insofar as they do not depart from the spirit or scope of this invention.

INDUSTRIAL APPLICABILITY

The present invention provides a reception device and a reception method which make it possible to decrease the calculation of demodulating the signal by the reception device from the transmission device.

The invention claimed is:

1. A reception device comprising:
a replica signal generating unit which generates a replica signal which is a replica of a transmitted signal based on a received signal;
a time period setting unit which sets a plurality of time periods which time period of the received signal is divided into based on a received power of the received signal;
an arrival wave removing unit which removes an arrival wave from the received signal for each time period set by the time period setting unit using the replica signal generated by the replica signal generating unit;
a combining unit which combines the signals from which the arrival waves are removed by the arrival wave removing unit for each time period set by the time period setting unit; and
a demodulation processing unit which performs a demodulation process for the signal combined by the combining unit.

2. The reception device according to claim 1, the arrival wave removing unit comprising:
an arrival wave replica generating unit which generates a replica of the arrival wave of each time period based on a channel impulse response estimation value of the received signal, the replica signal generated by the replica signal generating unit and the time periods set by the time period setting unit; and
a subtracting unit which abstracts the received signal of each time periods set by the time period setting unit by subtracting the replica of the arrival wave of each time period generated by the arrival wave replica generating unit from the received signal.

3. The reception device according to claim 2, wherein the time period setting unit sets each time period based on a total number of the received power of the received signal which is included in each time period when the received signal is divided in a plurality of time periods, and a predetermined number.

4. The reception device according to claim 2, wherein the time period setting unit sets each time period referencing a minimum value of total of a received power of the received signal which is included in a predetermined time.

5. The reception device according to claim 2, wherein the time period setting unit sets each time period based on a minimum difference between a total number of the received power of the received signal which is included in each time period when the received signal is divided into a plurality of time periods and the predetermined power.

6. The reception device according to claim 1, wherein the time period setting unit sets each time period based on total number of the received power of the received signal which is included in each time period when the received signal is divided in a plurality of time periods, and a predetermined number.

7. The reception device according to claim 1, wherein the time period setting unit sets each time period referencing a minimum value of total of a received power of the received signal which is included in a predetermined time.

8. The reception device according to claim 7, wherein the time period setting unit uses a guard interval length as the predetermined time.

9. The reception device according to claim 1, wherein the time period setting unit sets each time period based on a minimum difference between a total number of the received power of the received signal which is included in each time period when the received signal is divided into a plurality of time periods and a predetermined power.

10. A reception device comprising:
a replica signal generating unit which generates a replica signal which is a replica of a transmitted signal based on a received signal;
a group setting unit which divides the received signal based on a predetermined time, and separates each time period into groups based on a received signal power which is included in the divided each time periods;
an arrival wave removing unit which removes the arrival wave from each group set by the group setting unit using the replica signal generated by the replica signal generating unit;
a combining unit which combines the signals from which the arrival wave is removed by the arrival wave removing unit for each time period set by the group setting unit; and
a demodulation processing unit which performs a demodulation process for the signal combined by the combining unit.

11. The reception device according to claim 10, wherein the group setting unit sequences each time period which is divided based on the predetermined time based on a size of the received signal which is included in each time period, and sets a large power received signal and a small received signal to a same group.

12. The reception device according to claim 10, wherein the group setting unit separates into groups to minimize the difference between a total of the received power of the received signal which is included in each group and a predetermined power when each time period is divided based on a predetermined time.

13. A reception method comprising:
a replica signal generating step which generates a replica signal which is a replica of a transmitted signal based on a received signal;
a time period setting step which sets a plurality of time periods which a time period of the received signal is divided into based on a received power of the received signal;
an arrival wave removing step which removes an arrival wave from the received signal for each time period set in the time period setting step using the replica signal generated in the replica signal generating step;
a combining step which combines the signals from which the arrival wave is removed in the arrival wave removing step for each time period set in the time period setting step; and
a demodulation processing step which performs a demodulation process for the signal combined in the combining step.

14. A reception method comprising:
- a replica signal generating step which generates a replica signal which is a replica of a transmitted signal based on a received signal;
- a group setting step which divides the received signal based on a predetermined time, and separates each time period into groups based on a received signal power which is included in each divided time period;
- an arrival wave removal abstracting step which removes the arrival wave from each group set in the group setting step using the replica signal generated in the replica signal generating step;
- a combining step which combines the signals from which the arrival wave is removed in the arrival wave removing step for each time period set by the group setting step; and
- a demodulation processing step which performs a demodulation process for the signal combined in the combining step.

* * * * *